United States Patent [19]

Younger

[11] Patent Number: 5,151,687
[45] Date of Patent: Sep. 29, 1992

[54] APPARATUS FOR LOGGING ELECTRONIC MEDIA-TAPED MATERIAL

[76] Inventor: George G. Younger, 10553 Farallone Dr., Cupertino, Calif. 95014

[21] Appl. No.: 554,138

[22] Filed: Jul. 16, 1990

[51] Int. Cl.$^5$ .............................................. G09G 5/00
[52] U.S. Cl. ...................................... 340/706; 40/491
[58] Field of Search ............... 340/706, 711, 721, 734; 40/491, 901; 84/485 SR; 235/70 R, 70 A, 70 B, 70 C; 358/102

[56] References Cited

U.S. PATENT DOCUMENTS

| | | | |
|---|---|---|---|
| 2,738,760 | 3/1956 | Myers | 40/491 |
| 2,770,900 | 11/1956 | Smith | 40/491 |
| 2,803,075 | 8/1957 | Pearne | 40/506 |
| 2,918,036 | 12/1959 | Giordana | 116/308 |
| 3,596,390 | 8/1971 | Scalice | 40/491 |
| 4,005,388 | 1/1977 | Morley et al. | 340/711 |
| 4,025,766 | 5/1977 | Ng et al. . | |
| 4,115,870 | 9/1978 | Lowell | 364/900 |
| 4,117,542 | 9/1978 | Klausner et al. | 364/900 |
| 4,469,380 | 3/1987 | Penna | 340/731 |
| 4,792,864 | 12/1988 | Watanabe et al. | 358/335 |

FOREIGN PATENT DOCUMENTS 0066963 4/1983 Japan .
2189922 11/1987 United Kingdom .

*Primary Examiner*—Jeffery A. Brier

[57] ABSTRACT

An apparatus for recording identifying data of electronic media-taped material is provided in two embodiments: mechanical and electronic. An example mechanical embodiment has a rectangular case with dimensions approximating those of a video cassette container, to facilitate compatible storage. Movable slides are mounted within the case, with icons on their upper surfaces, identifying status and subjects relating to tape condition and recorded material, respectively. The case front comprises a panel face, window, slots, and labels. Tabs project through the slots and provide means to set current tape status and material subject icons in the display window for selected tape time slots. During retrieval of material previously recorded, the operator determines taped material subject and duration, recorder counter reading, and time slot status by viewing the state/subject icons displayed, in relation to panel face labels. An example electronic embodiment has a thin, rectangular case, for convenient fit in one hand of the operator. The case holds electronic/electrical parts, including power supply, microcontroller, external RAM, LCD, display controller/drivers, and keyboard. The unit provides capability to store, via keyboard input, the current set-up code (for selected tape type and recorder tape speed setting) and status/subject information, which is held in continuously powered external RAM until needed for output retrieval/monitoring or change. Each unit case carries legends, as appropriate, identifying useful information; e.g., instructions, icon key, specifications, display map, state and subject settings, and time slot availability list.

16 Claims, 20 Drawing Sheets

INSTRUCTIONS

1. MAKE SURE COUNTER IS SET TO 0000 BEFORE ALL TAPING/RETRIEVAL ACTIONS.
2. WHEN TAPE IS BLANK, SET STATE ICON ⊘ IN WINDOWS OF ALL TIME SLOTS.
3. AFTER TAPING PROGRAM, SET SUBJECT ICON IN STATUS WINDOW OF APPROPRIATE NUMBERED SLIDE.
4. IF PROGRAM EXTENDS BEYOND 1/2 HOUR, USE STATE ICON ⇒ FOR REQUIRED NUMBER OF TIME SLOTS.
5. IF SUBJECT MATTER HAS BEEN VIEWED, USE STATE ICON ⊘ TO INDICATE SLOT IS AVAILABLE.
6. TO LOCATE A SUBJECT FOR VIEWING, REWIND OR FF TAPE REEL TO APPROPRIATE COUNTER READING.

ICON KEY

STATE ICONS
- ⊘
- ⇒
- ✓

SUBJECT ICONS
- MOVIE
- COMMUNITY
- COMEDY
- MUSIC
- NEWS
- NATURE
- PBS
- SPECIAL
- SPORTS
- TALK
- PARK
- AVENUE
- CARTOON
- VARIETY
- BUSINESS
- ETC.
- TRAVEL

SPECIFICATIONS

- RCA VHS VCR
- T-120 (VK250) TAPE
- SLP RECORDING SPEED
- COUNTER READINGS ARE APPROXIMATE 10, 22, 24, 26

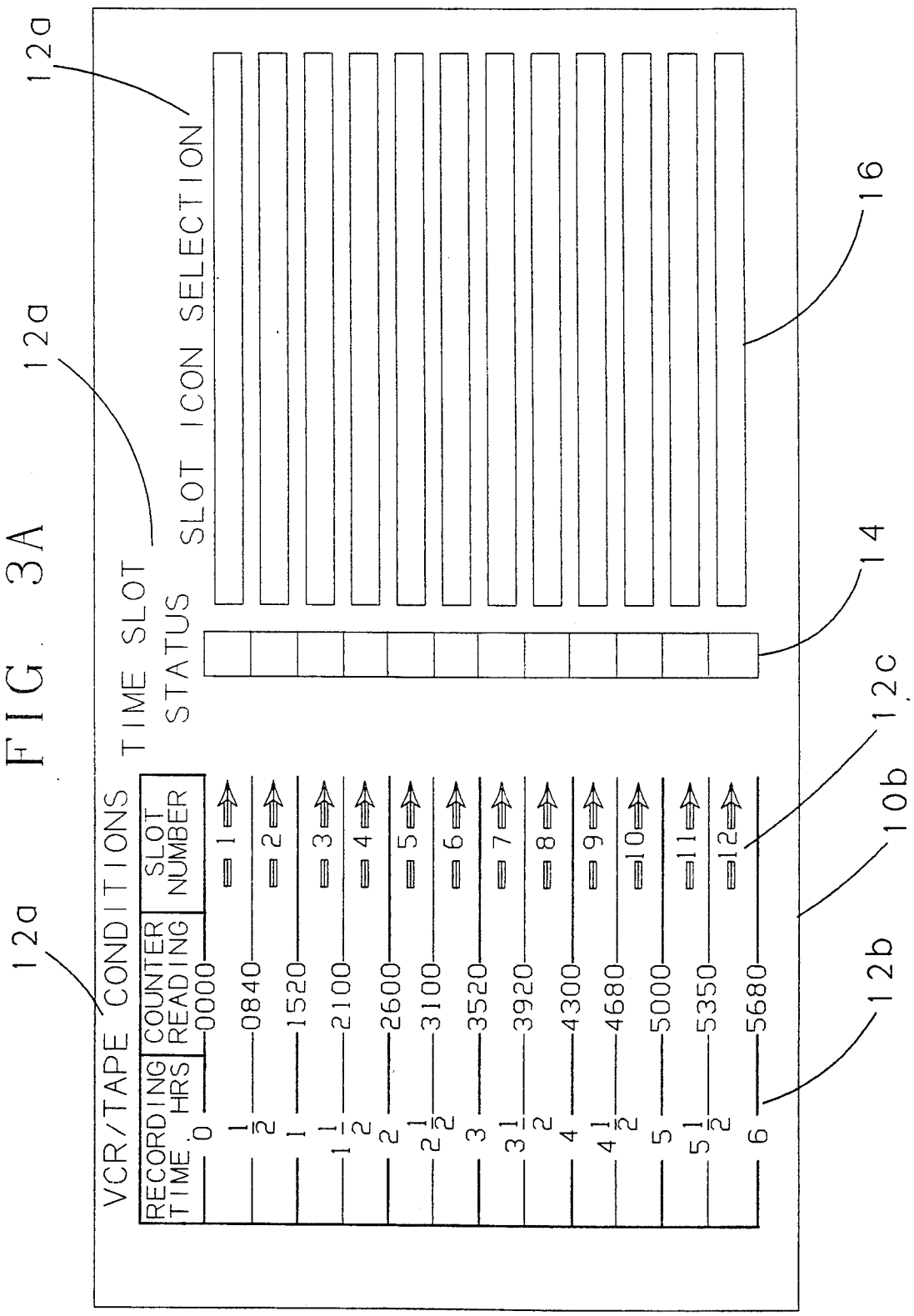

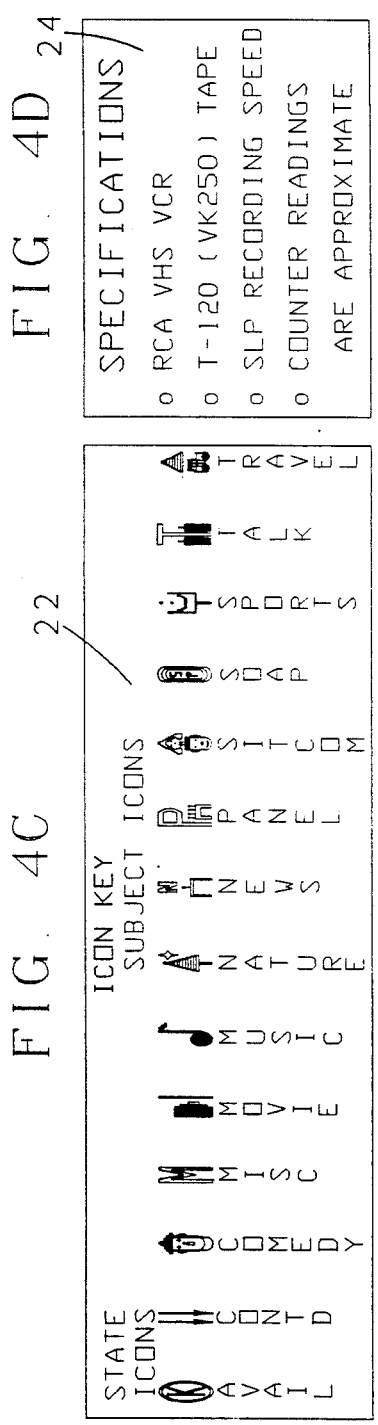
FIG. 4C
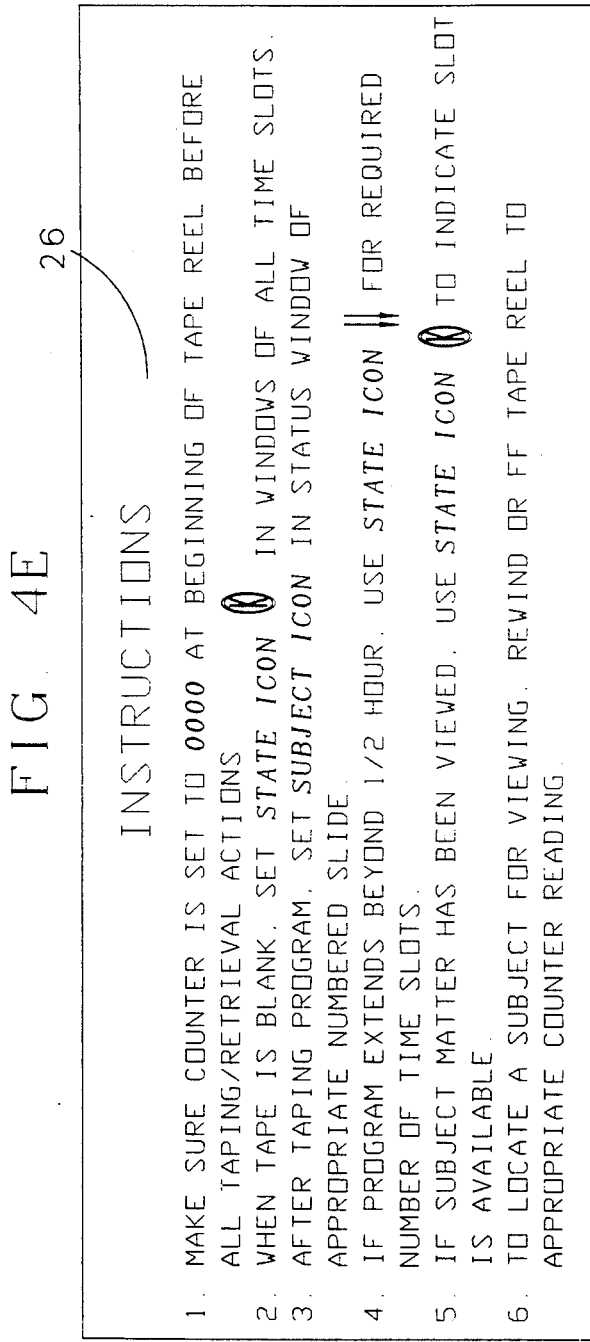
FIG. 4D
FIG. 4E

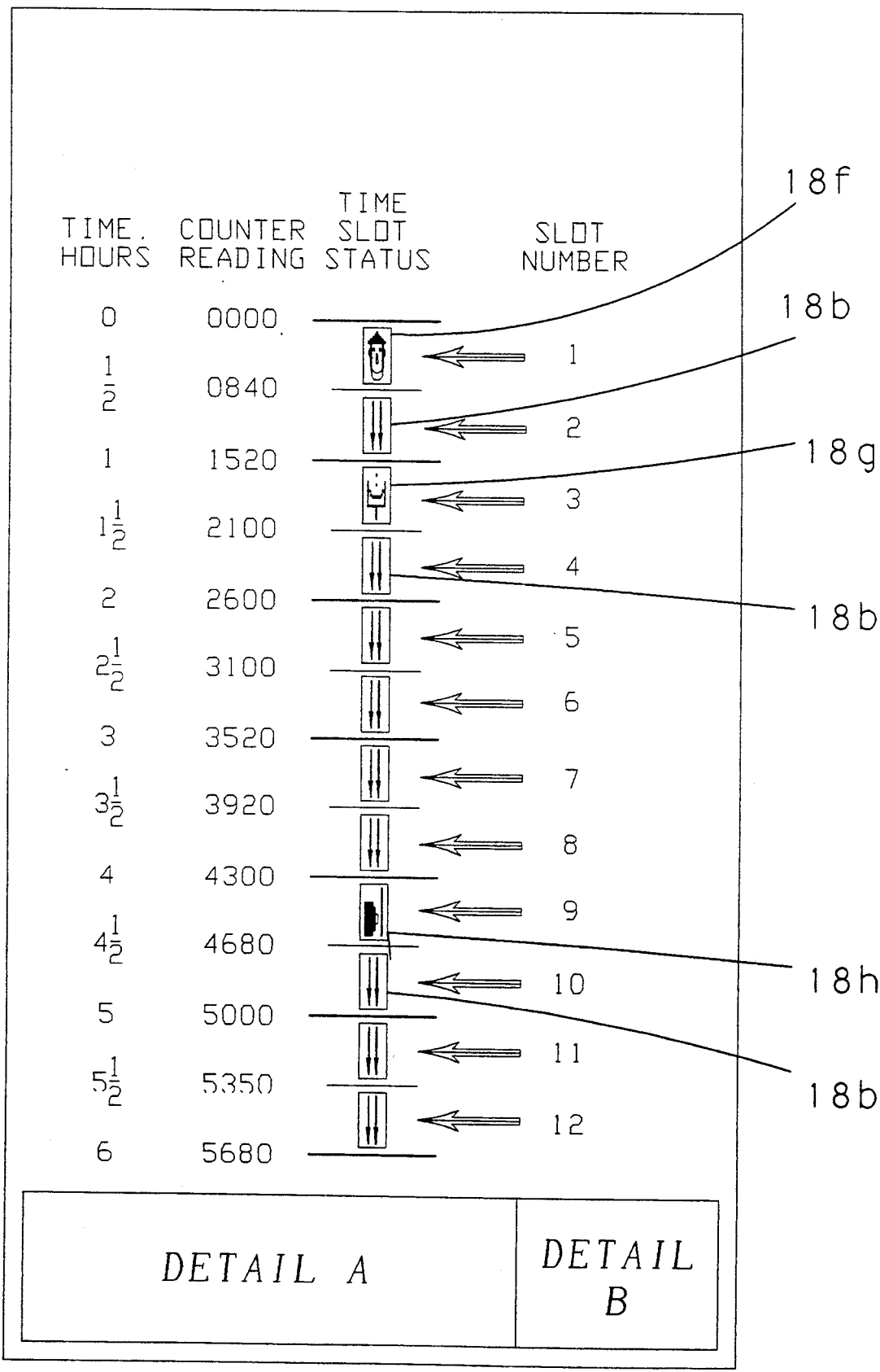

APPARATUS FOR LOGGING ELECTRONIC MEDIA-TAPED MATERIAL

BACKGROUND-FIELD OF INVENTION

This invention relates to an apparatus for logging electronic media-taped material; specifically logging information including material subject, material duration, and location on the tape, to facilitate later retrieval for viewing and/or listening.

BACKGROUND-DESCRIPTION OF PRIOR ART

Use of an electronic media tape recorder usually involves taping a variety of material of different durations and content. This material may be taped at widely disparate times and tape locations, making reconciliation of records difficult. For example, a home-use video cassette recorder (VCR) may include up to eight hours of sports, news, situation comedy and nature programs, recorded at various time durations and tape counter readings. The prior art available to keep records for such tapings is inadequate.

Heretofore, electronic media cassette tape manufacturers have provided, as part of cassette packaging and storage material, self-adhesive labels and other aids for keeping written records of taped programs. This method of record-keeping is awkward and inefficient, as it requires considerable effort to document pertinent data by pen/pencil, affix labels, etc. Further, frequent replays and overtapings change tape content, obsoleting prior records and complicating future record-keeping.

Most video cassette recorders (VCRs) incorporate a feature in the counter mechanism to facilitate locating the start of the most recently taped material. This feature allows the operator to set the counter to zero before taping. When the taping is completed and the tape is rewound, the recorder mechanism automatically stops rewinding at the zero counter reading. This feature allows locating the start of the most recently taped material, but does not aid in locating or identifying material at other locations on the tape. Further, the tape reel must be completely rewound to its beginning in order to reestablish true zero, which is a time consuming process. Audio tape recorders also incorporate resetable counters, but they normally do not include the automatic stopping feature.

A type of status indicating device designed to be attached to a large, spool-type reel is disclosed by Meyers (U.S. Pat. No. 2,738,760). However, the primary features of this device are merely to provide a color-coded "flag" of overall tape status, a written record of tape content on an insert label card, and means to secure the free end of the tape. The label card essentially corresponds to self-adhesive labels discussed previously. Meyers' indicator does not provide the discrete elements of descriptive information relating to taped material subject, duration, and location and tape status provided in the present invention. Further, the utility of Meyers' indicator is limited to a requirement to attach to the tape storage device, and has no application for cassette-type tapes and disclosed herein.

Considering home-use application of VCRs, frequent tapings of various television programs of interest produce a multitude of video tape cassettes. Stored tapes usually accumulate with very little record of lengths and types of program or where a particular program resides on a given tape. This lack of information creates an almost insurmountable problem in retrieving a selected excerpt for viewing. It is particularly difficult to identify and play a selected program when an extended time period has elapsed between taping and viewing, and recollection of taping details is uncertain.

Current methods of record-keeping for electronic media-taped material are elementary and inadequate. The method inherent in the recorder cassette labels, discussed previously, could be extended to provide a detailed, written log of required information. That approach, however, would be cumbersome and time-consuming.

Consequently, a logging device is proposed in the present invention which provides a means of recording pertinent data relative to electronic media-taped material. This implementation is easy to use, allows identifying data to be revised readily, and provides either a dynamic or a stationary record of tape content and related particulars. As a result, selected electronic media-taped material desired for replaying may be identified and located on the tape with minimum difficulty. Electronic media-taped material includes video and/or audio tapes for any application, including home, scientific, or business use.

OBJECTS AND ADVANTAGES

Accordingly, several objects and advantages of my invention are:

(a) to fulfill an existing need for a method of logging pertinent data relative to the subject, duration, and location on the tape of electronic media-taped material without requiring laboriously prepared written notes;

(b) to provide one alternative logging device design which is relatively inexpensive to produce; thereby, encouraging its use in large quantities;

(c) to propose the feasibility of a second alternative logging device design which is relatively more expensive to produce, but has greater durability and versatility and is, therefore, a more likely candidate for long term, rough, or universal application;

(d) to provide a simple means of revising/updating previously documented electronic media-taped material identification and location particulars without requiring undue effort or time;

(e) to provide a logging device having inherent ease of operation;

(f) to provide a logging device which will reduce or eliminate the likelihood of unrecognized input errors;

(g) to provide an inexpensive logging device which can be stored in the company of each applicable tape cassette in the operator's tape library, and (h) to provide a small, light-weight device which can be used regularly and conveniently on a day-to-day basis, in a mode very similar to that of a TV remote controller.

Further objects and advantages of my invention will become apparent from a consideration of the drawings and ensuing description of it.

BRIEF DESCRIPTION OF DRAWINGS

The preferred and alternative embodiments of my invention are delineated by way of example in the following described figures. Closely related figures have the same number but different alphabetic suffixes in the drawings.

FIG. 1A shows an illustrative example plan view of horizontal implementation of mechanical logging device in accordance with the present invention.

FIG. 1B shows an illustrative example bottom view of horizontal implementation of mechanical logging device in accordance with the present invention.

FIG. 3A is a plan view of combined panel face and case front assembly of horizontal implementation of mechanical logging device.

FIG. 4C shows an enlarged version of the icon key block in FIGS. 4A and 4B.

FIG. 4D shows an enlarged version of the specifications block in FIG. 4A.

FIG. 4E shows an enlarged version of the instructions block in FIG. 4B.

FIG. 8B shows a plan view of vertical mechanical logging device illustrating selected operational settings of slot status icons.

REFERENCE NUMERALS IN DRAWINGS

Figure 2A:
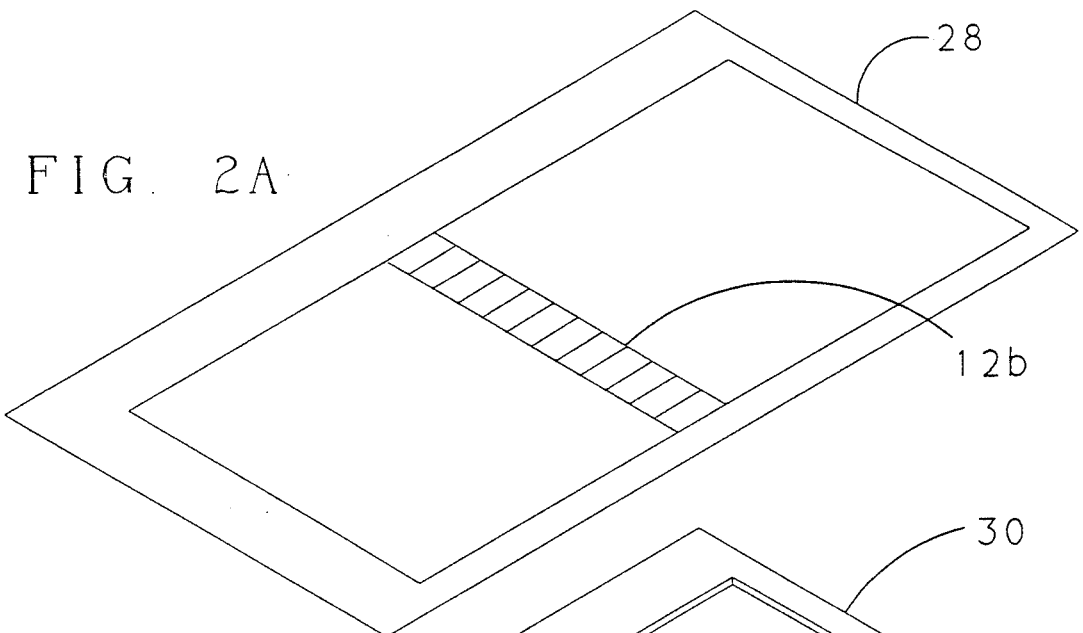
FIG. 2A is an isometric view of window-spacer layer for horizontal implementation of mechanical logging device.

The following reference numerals are used in drawings to identify all individual parts and components. Numerals for closely related objects have the same number but different alphabetic suffixes:

| | |
|---|---|
| 10 | Case |
| 10a | Case Back |
| 10b | Case Front |
| 12 | Panel Face |
| 12a | Label |
| 12b | Division Lines |
| 12c | Time Slot Locators |
| 14 | Display Window |
| 14a | Electronic Display - Set-up Mode |
| 14b | Electronic Display - Status Mode |
| 14c | Liquid Crystal Display (LCD) |
| 15 | Display Map |
| 16 | Slot |
| 18 | Slide |
| 18a | Slide Music Program Setting |
| 18b | Slide Program Continued Setting |
| 18c | Slide Travel Program Setting |
| 18d | Slide Talk Show Setting |
| 18e | Slide Slot Available Setting |
| 18f | Slide Comedy Show Setting |
| 18g | Slide Sports Program Setting |
| 18h | Slide Movie Program Setting |
| 20 | Tab |
| 22 | Icon Key |
| 24 | VCR, Tape, and Setting Specifications |
| 25 | Recorder Specification and Set-up Codes |
| 25a | Electronic Media Recorder Specification |
| 25b | Set-up Code Selection List |
| 25c | State and Subject Settings |
| 25d | Time Slot Availability List |
| 26 | Instructions |
| 28 | Window-Spacer Layer |
| 30 | Spacer Layer |
| 32 | Slide-Guide Array |
| 34 | Icon Strip |
| 36 | Slide Base |
| 38 | Keyboard |
| 40 | Address Bus |
| 42 | Data Bus |
| 44 | Control Bus |
| 46 | Power Supply |
| 46a | Battery |
| 46b | Voltage Regulator |
| 48 | Microcontroller |
| 50 | Central Processing Unit (CPU) |
| 52 | Read-Only Memory (ROM) |
| 54 | Internal Random Access Memory (RAM) |
| 56 | Input/Output (I/O) Ports |
| 56a | External RAM I/O Ports |
| 58 | Oscillator |
| 60 | External RAM |
| 62 | Dot Matrix LCD Controller/Driver |
| 62a | External Display Driver |
| 62b | Separate Power Supply |
| 64 | 7-Segment LCD Controller/Driver |
| 66 | Liquid Crystal Display Module |

DESCRIPTION

The apparatus in the present invention is conceivably applicable in any situation which requires an individual to log certain identifying information pertaining to electronic media-taped material, so as to facilitate later retrieval. Possible applications can involve audio, video, or audio-video in business, scientific, or personal use. The application selected for description by way of examples herein is logging information relative to commercial television programs recorded on a home-use VCR.

Three embodiments of my invention are described in this section. The first two are preferred and alternate implementations of a mechanical embodiment. The third embodiment described is electronic. The mechanical embodiments are adapted to low cost production, thereby encouraging use in great numbers. They are intended for use for a particular set of design specifications, but can be produced, readily, to support other design specifications. The electronic embodiment involves relatively higher production cost, but is more universally applied in varying use conditions. It is also more readily adapted to continuous use on a long term basis, much in the manner of a TV remote controller, and is designed having a greater number of capabilities than the mechanical embodiments.

Figure 1A:
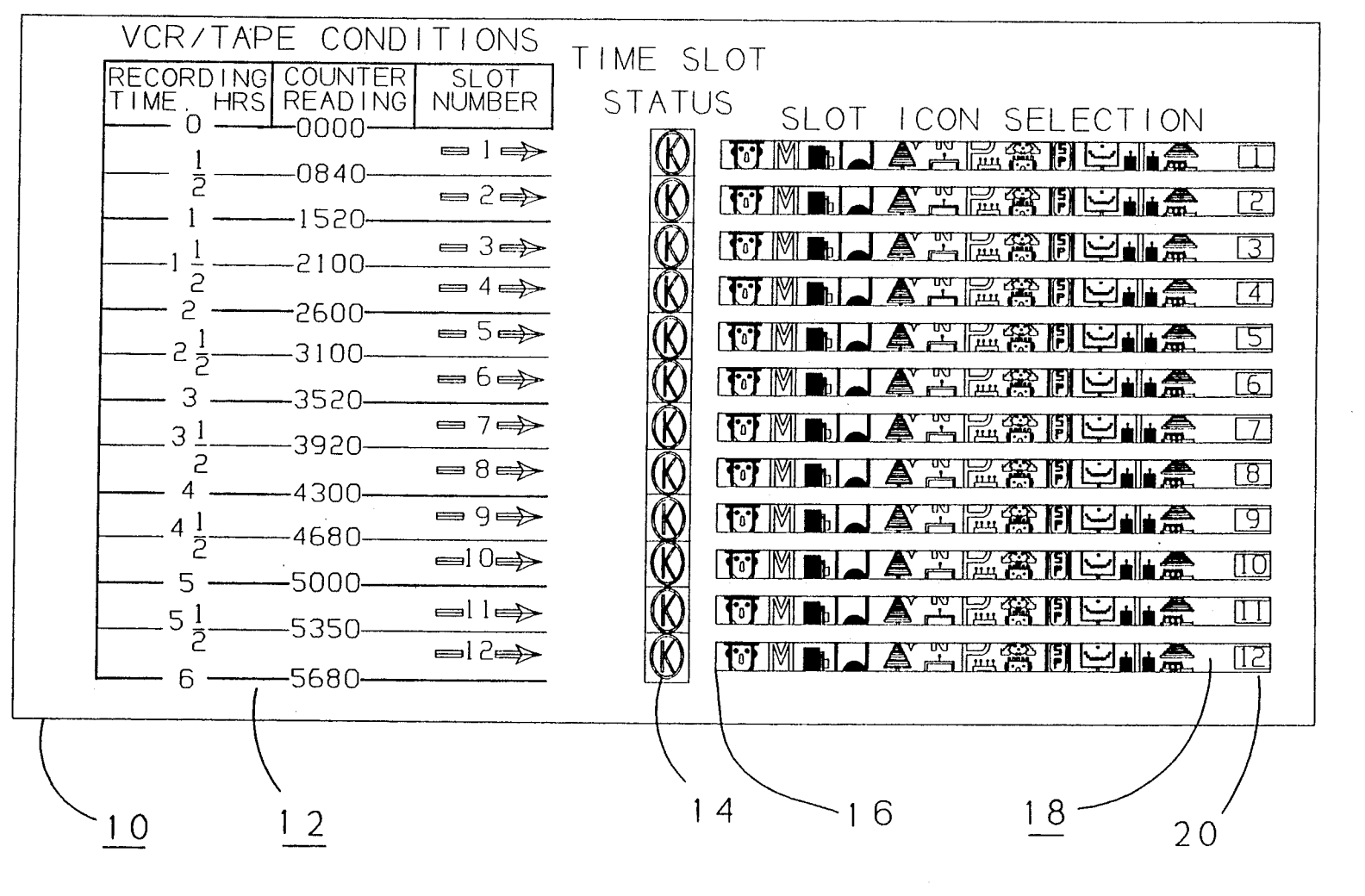

PREFERRED MECHANICAL EMBODIMENT—FIGS. 1 TO 3

FIGS. 1A and 1B show an illustrative example plan view and a bottom view, respectively, of the preferred (horizontal) implementation of the mechanical logging apparatus in the present invention. The information logging capability this apparatus provides includes subject, duration, and location on the tape of the material recorded, within the limits of the example tape cassette and VCR setting. The example device is based on the use of a RCA Corporation VHS VCR using a T-120 video cassette and VCR setting of Super Long Play (SLP). Further details pertaining to specifications are discussed later herein.

Shown in FIGS. 1A and 1B, the logging apparatus consists of a thin rectangular case 10 having dimensions approximately 4.0 inches in length and 7.3 inches in width. Case 10 thickness is approximately 120 mils for this example, and is considered the minimum practical thickness to maintain desired case rigidity. These dimensions are purposely chosen to provide plan view measurements approximating those of a standard video cassette tape, so as to allow storing the logging device with or within the video tape container. A comparable logging device designed for use with audio-taped material, for example, would have preferred plan dimensions of approximately 2.5 inches in length and 4.0 inches in width. Minimum thickness is desired both to provide rigidity of the apparatus during operation and permit storage within the associated video tape cassette box, if desired. In the event a tape storage box cannot accommodate the thickness of case 10, the apparatus may be stored conveniently with or attached to the associated video tape container.

FIG. 1A, plan view, shows the front of the apparatus, which comprises a panel face 12, a display window 14, slots 16, slides 18, and slide tabs 20. The panel face 12 provides the definitions of the input means and output display means and presents conditions peculiar to tape recorder model and operational setting, including recording time in half-hour intervals, counter reading, and number designation of a given time slot. The display window 14 provides a means of viewing the current status of a given time slot by observing the visible markings on the upper surfaces of slides 18 below. A plethora of slides 18 have tabs 20 which protrude through companion slots 16. Tabs 20 provide the movement means for slides 18.

FIG. 1B, bottom view, shows the back of the apparatus, which presents blocked areas defining instructions 26, icon key 22, and VCR, tape, and setting specifications 24. Instructions 26 are discussed in detail in the section titled "Operation". There are several methods of identifying media-taped material subject category, including descriptive words, mnemonics, numeric codes, abbreviations, symbols, or icons. Icons are selected in the preferred embodiment because they are readily adapted to the small size requirements of the configuration and provide easily remembered associations with the recorded material. Icon key 22 presents two categories of icons: state and subject. State icons define the state of the time slots: that is, whether the time slot is available for receiving recorded material or used for continuation of active subject material. Subject icons are designed to identify different categories of TV program which a user might record. A total of twelve subject icons is used to fit in available length of slide 18, be easily interpreted through display window 14, and meet spacing requirements between icons on slide 18. A subject icon named "miscellaneous" is included to accommodate subject material which may not be covered by other available icons.

The VCR, tape, and setting specifications 24 are established and stated in the location denoted in FIG. 1B. Different specifications apply for different recording conditions, depending on VCR counter mechanism design, type video cassette tape selected, and VCR recording speed setting. The preferred embodiment is based on use of a RCA Corporation VHS VCR, a T-120 tape cassette, and a VCR recording speed setting of SLP. These specifications are chosen based on personal experience and the likelihood that these conditions most frequently apply. For example, although counter mechanisms may not be standardized to the RCA Corporation design, most are likely to conform. Also, this selection of cassette and VCR setting is more likely to be used than alternates, because all standard tape cassette designs (T-60, T-120, and T-160) and speed settings other than SLP for the T-160 will result in shorter total recording times. Shorter recording time lessens the difficulty of tracking tape content and, thereby, reduces the need for a logging device. With slight modifications, the example mechanical embodiment can be adapted to alternate specifications, such as the use of a T-160 cassette and Long Play (LP) or SLP speed setting. The apparatus can be used without modification if the VCR has a time-based counter design. In addition, a more universally applicable design is discussed in the section titled "Preferred Electronic Embodiment".

Figure 2B:
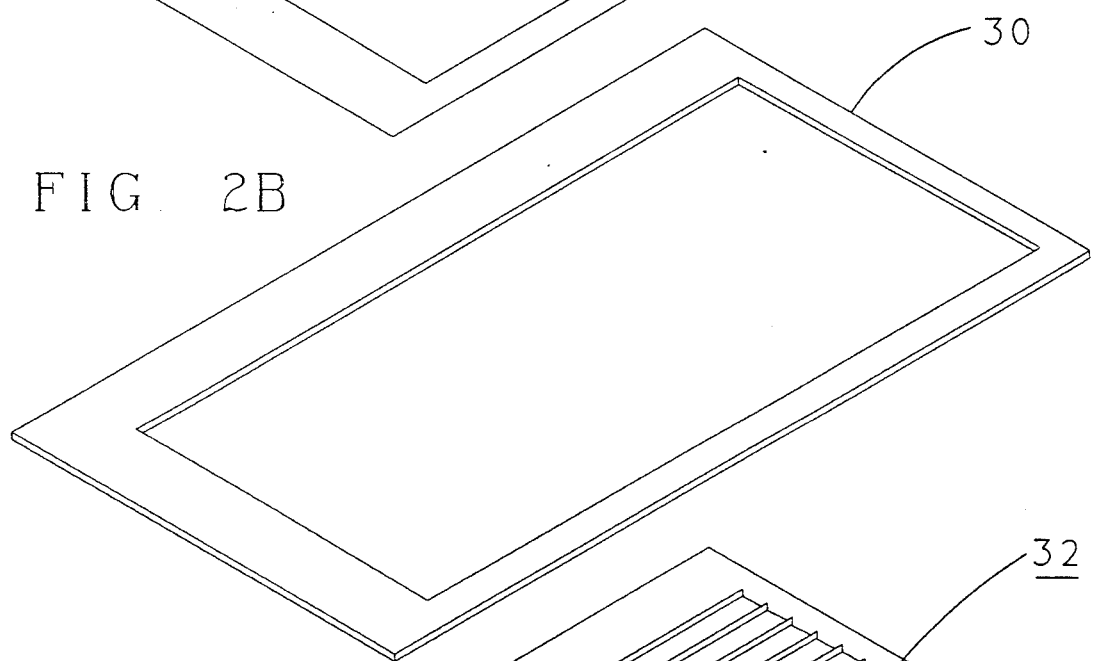
FIG. 2B is an isometric view of spacer layer for horizontal implementation of mechanical logging device.
Figure 2C:
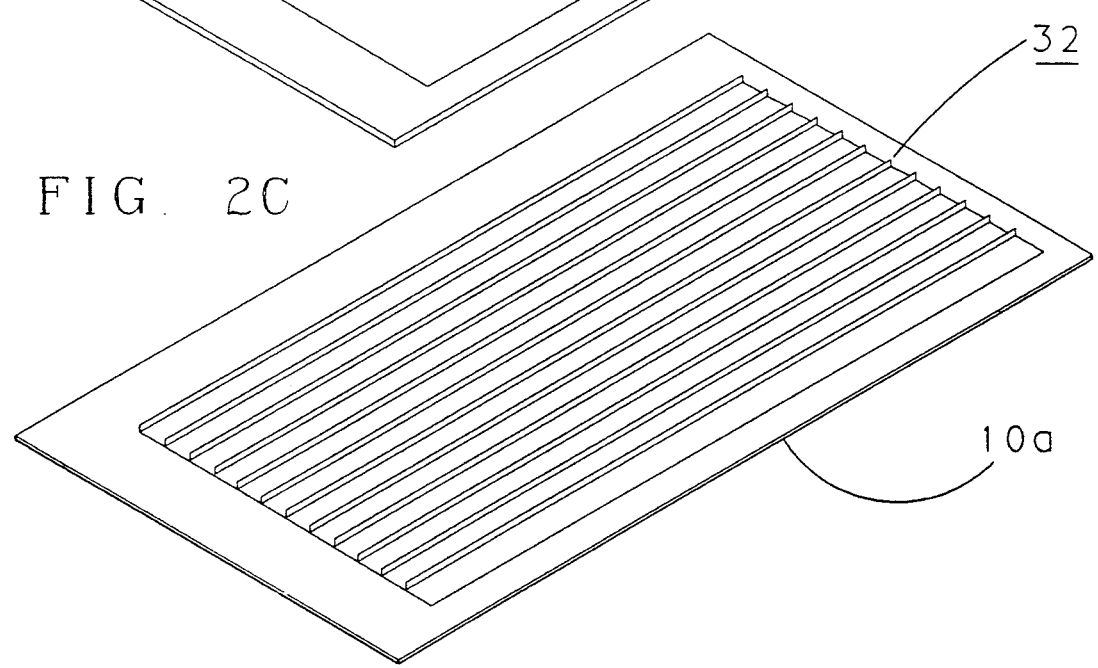
FIG. 2C is an isometric view of combined slide-guide array and case back assembly for horizontal implementation of mechanical logging device.

FIGS. 2A, 2B, and 2C present isometric views of three components of the preferred mechanical embodiment case design. All three components have outside dimensions corresponding to those described for case 10. The window-spacer layer 28 is made of a clear material, has a thickness of approximately 8 mils, and has cutouts, primarily to allow access to tabs 20 below. The window-spacer layer 28 has black division lines 12b on its center strip which mesh with corresponding black division lines 12b on panel face 12. Division lines 12b on window-spacer layer 28 are visible through display window 14, and demark the interfaces among slides 18 mounted below. The main functions of window-spacer 28 are to provide a solid, clear window to protect and view slides 18 below, provide division lines 12b, and fill the space resulting from the thickness dimension of the slide-guide array 32 material mounted below. Spacer layer 30 is made of opaque material, has a thickness of approximately 62 mils, and has a frame configuration which fits over the slide-guide array 32. The case back 10a is made of opaque material, has a thickness of approximately 30 mils, and has mounted on its upper surface slide-guide array 32. The positioning of slide-guide array 32 on case back 10a is critical, to allow proper movement of tabs 20 in slots 16 without obstructing any part of slides 18 when viewed through display window 14. This requirement results in an offset of slide-guide array 32 to the right on the upper surface of case back 10a, as shown. Slide-guide array 32 is required to be fabricated or molded in very thin sections; approximately 10 mils thickness, in order to conserve space for the primary elements, slides 18. Height of an individual guide is approximately 62 mils. Slide-guide array 32 accepts slides 18 in a tight friction fit, so as to lessen the chance of accidental movement of slides 18. Additionally, if the mating parts are made of molded plastic, detents can be provided to further prevent accidental movement of slide 18 in slide-guide array 32. The slide-guide array 32 also provides a track for and prevents interference between slides 18.

FIG. 3A shows a plan view of the combined panel face 12 and case front 10b assembly. Components of the panel face 12 are labels 12a which define data input and output areas, division lines 12b which demark the boundaries of numbered time slots, and time slot locators 12c which locate the appropriate display window for a given time slot. Division lines 12b are alternating dark and light lines to distinguish full-hour from ½-hour time intervals. A clear area in the upper right corner of panel face 12 is available for a name or trademark. Panel face lettering is affixed by using any of a number of techniques, including silk-screening, printing, embossing, photoengraving, or decalcomania, depending on apparatus material and cost objectives. Silk-screening is recommended as the most economical and durable process to use. Case front 10b is a thin sheet of base material which receives markings for labels 12a, division lines 12b, and time slot locators 12c. Case front 10b thickness is approximately 20 mils, and has a rectangular vertical slot, display window 14, located along the apparatus vertical centerline. To the right of display window 14, is a series of twelve rectangular horizontal slots 16, equally spaced and centered on the movable slides 18, which are installed below. The assembly of case front 10b and the layers depicted in FIG. 2 make up the apparatus entire case 10.

Figure 3B:
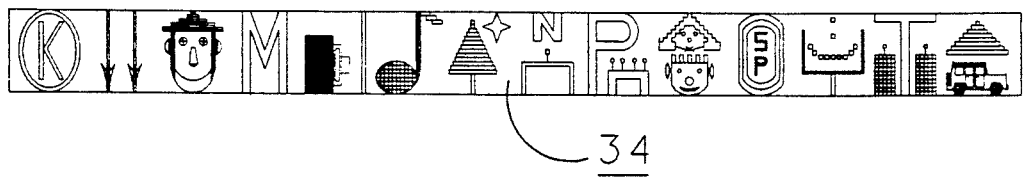
FIG. 3B is a plan view of icon strip for horizontal implementation of mechanical logging device.
Figure 3C:
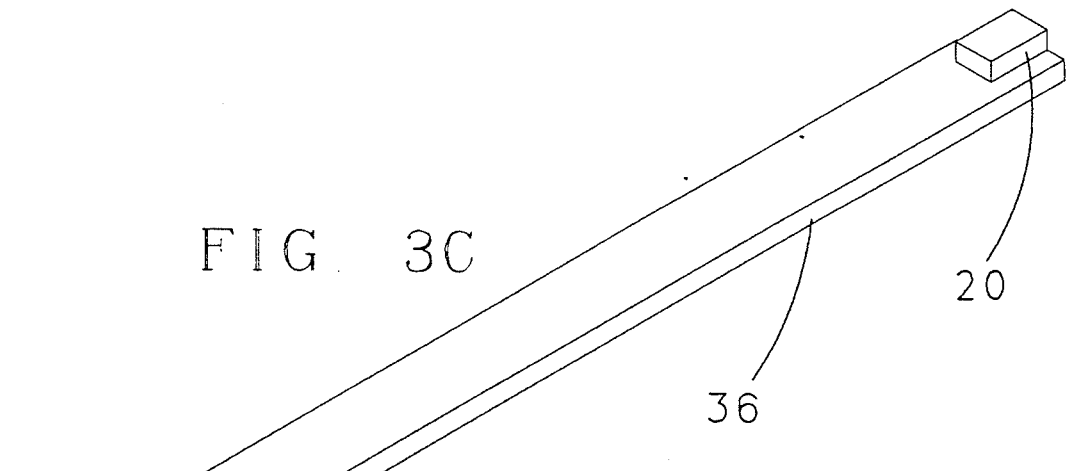
FIG. 3C is an isometric view of combined slide base and tab assembly for horizontal implementation of mechanical logging device.

Components of slide 18 are shown in FIGS. 3B and 3C. FIG. 3B shows the icon strip 34 which is affixed to the upper surface of slide base 36. Icon strip 34 is prepared using any of a number of software packages having capability to create customized fonts or icons; for example, Generic CADD 3.0, a trademark of Generic Software, Inc., Redmond, Wash. 98052. Spacing of state and subject icons on icon strip 34 is critical, to allow full visibility of an icon through display window 14 without overlap for all, including extreme, positions of slide 18. Dimensions of icon strip 34 are 3.13 inches long by 0.25-inch wide. FIG. 3C is an isometric plan view showing slide base 36 and tab 20 assembly. Slide base 36 has tab 20 attached to its right extremity, centered on its width. Slide base 36 is 3.5 inches long, 0.25-inch wide, and 1/16-inch thick. Tab 20 is 0.125-inch wide, 0.20-inch long, and 1/16-inch thick. Slide base 36 is fabricated using material obtained from the center of window-spacer 28. Twelve slides 18 are installed in slide-guide array 32, having tabs 20 projecting through slots 16.

Figure 3D:
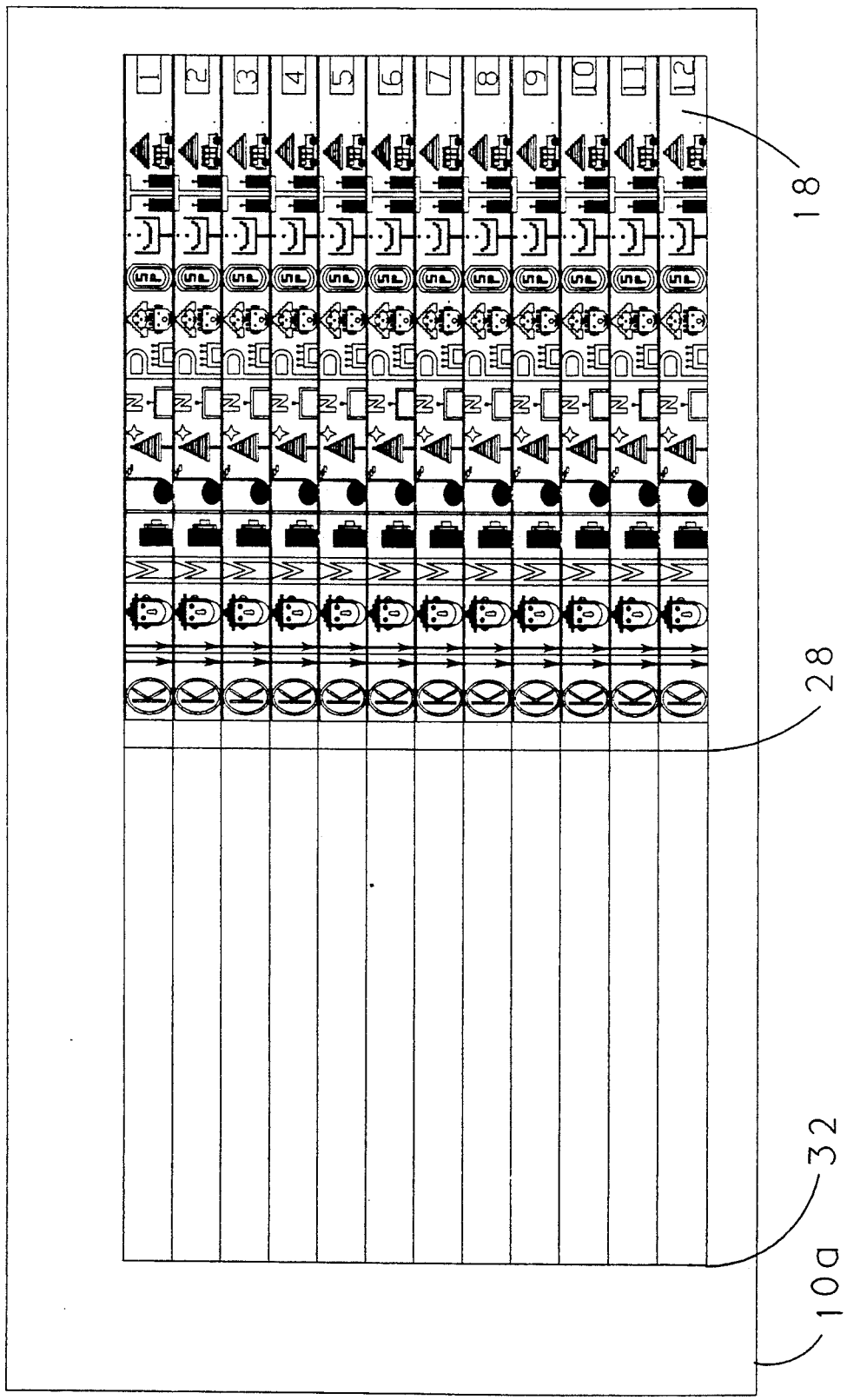
FIG. 3D is a plan view of combined window-spacer, spacer, slides, slide-guide array, and case back assembly for horizontal implementation of mechanical logging device.

FIG. 3D shows a plan view of the combined window-spacer layer 28, spacer layer 30, slides 18, slide-guide array 32, and case back 10a assembly for the preferred mechanical embodiment. Each tab 20 has affixed to its upper surface, in sequential order, a number corresponding to the time slot locator 12c on panel face 12. The combined assembly of case front 10b and the assembly shown in FIG. 3D constitutes the overall assembly of the preferred mechanical embodiment of the logging apparatus as depicted in FIGS. 1A and 1B. Considering, for example, an apparatus fabricated using vinyl sheet, assembly of the various layers may be accomplished using a high quality vinyl cement.

The primary advantages of the preferred (horizontal) implementation of the mechanical embodiment of the logging apparatus, as described in this section, versus the alternate implementation described below, are:

1. Data input means are facilitated by having slide tabs 20 visible on the front of the unit. This design allows the operator to see clearly the time slot numbers on slide tabs 20 with reduced risk of moving the wrong slide accidentally.

2. Front-mounted slide tabs 20 are less likely to be moved accidentally during periods of non-use.

3. Greater overall width of the unit, permits slide 18 lengths to be greater. An attendant advantage is reduced congestion of icons on icon strip 34 for a given number of state and subject icons.

Further advantages, and disadvantages, of the preferred embodiment will be apparent from the description of the alternate embodiment in the following section.

DESCRIPTION (CONTINUED)

Figure 4A:
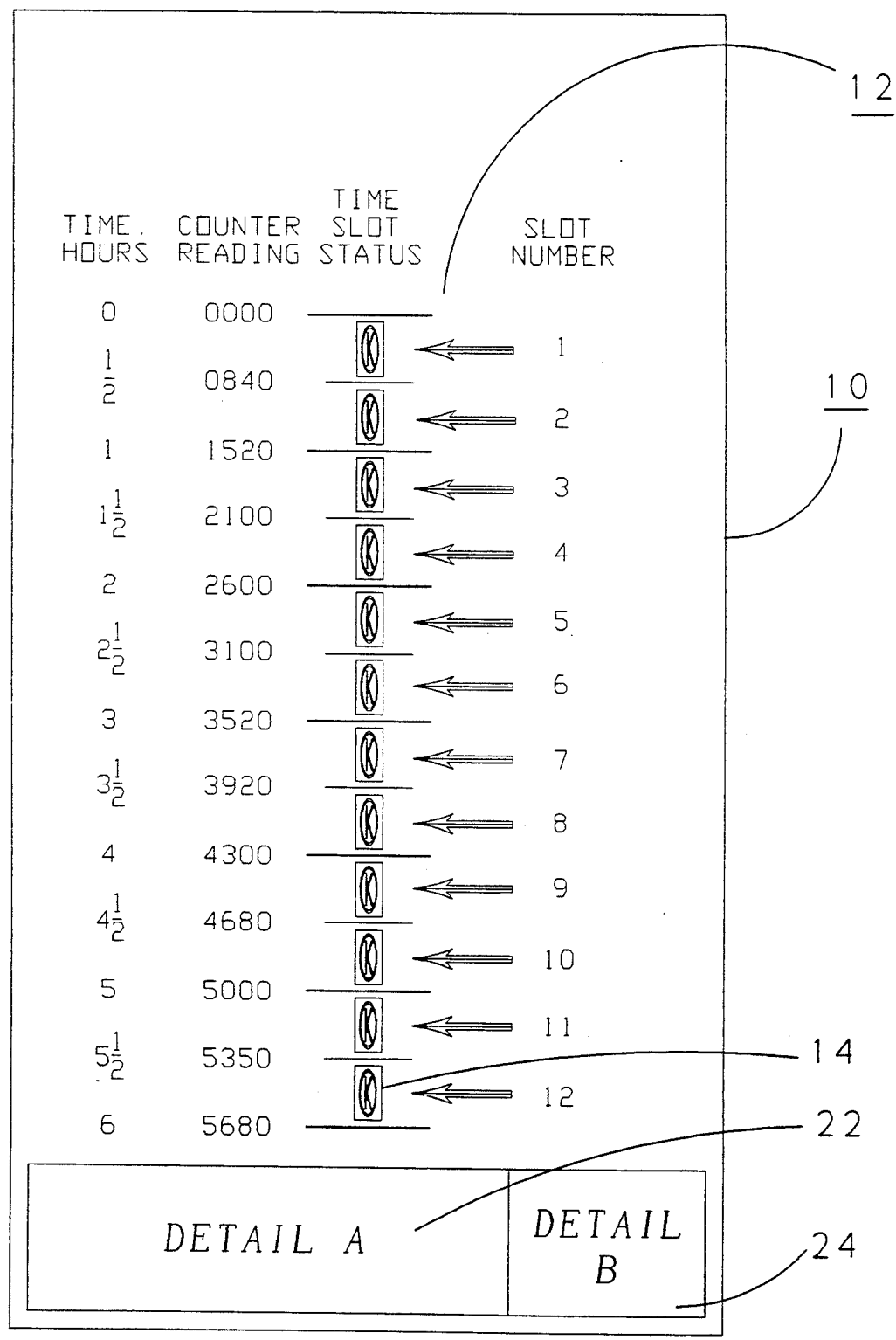
FIG. 4A shows an example plan view of mechanical logging device illustrating an alternate vertical implementation.
Figure 4B:
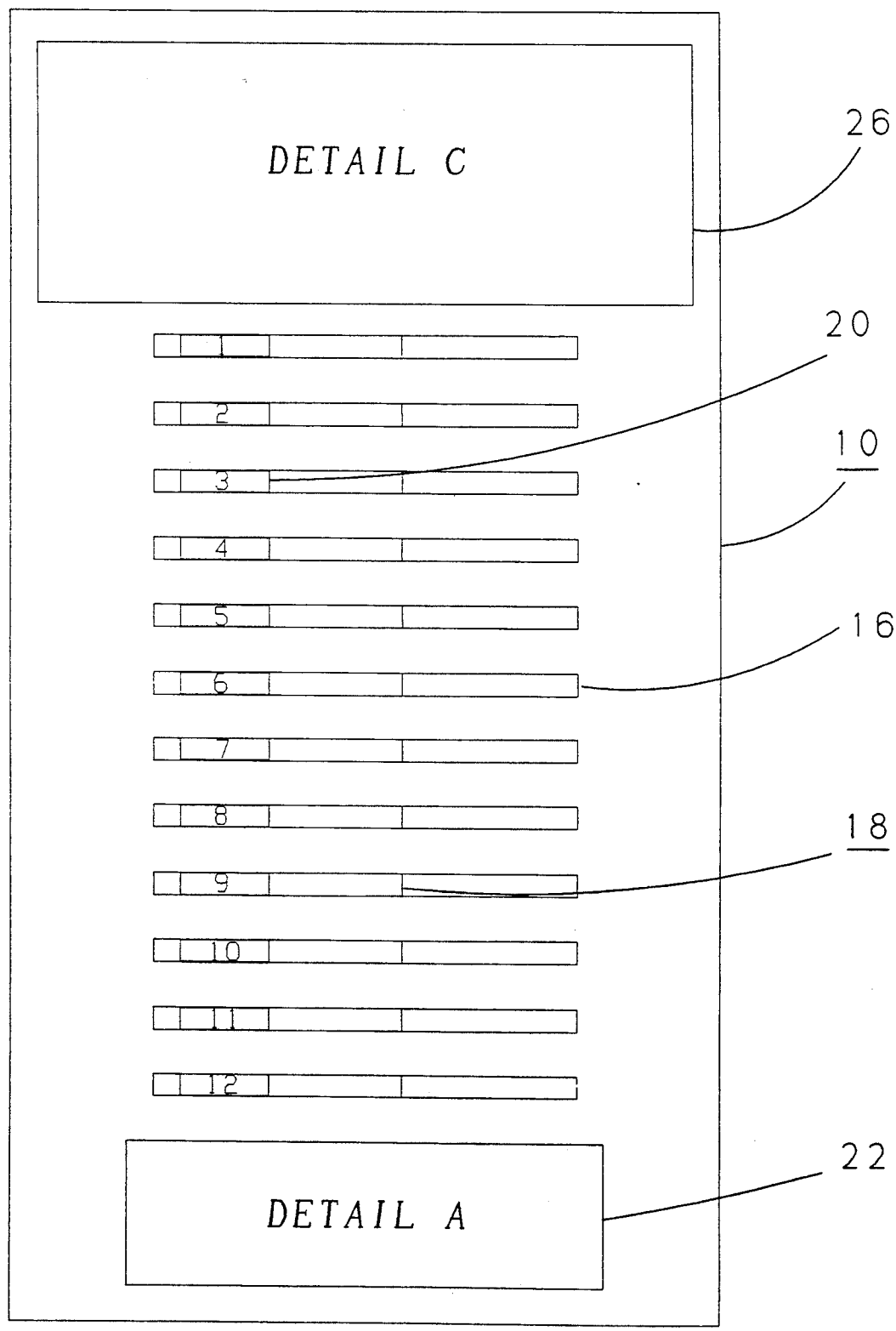
FIG. 4B shows an example bottom view of mechanical logging device illustrating an alternate vertical implementation.
Figure 5:
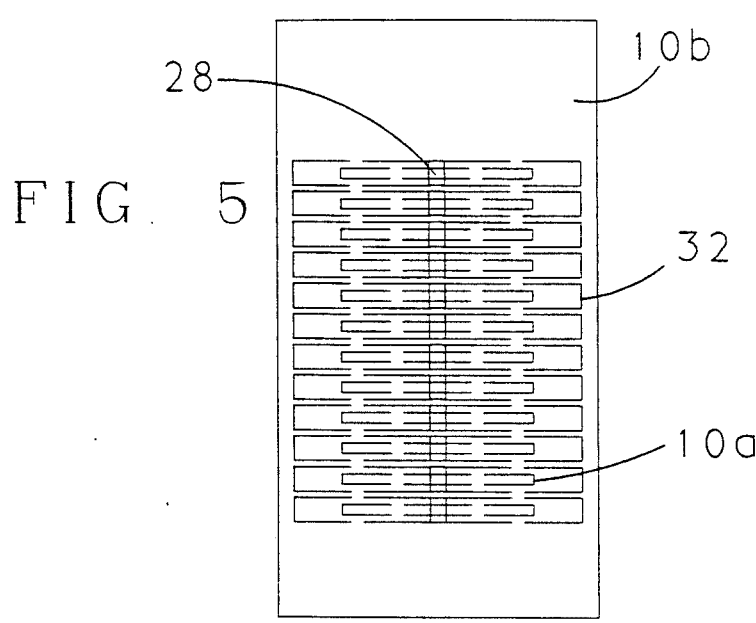
FIG. 5 is a plan view of combined case front, window-spacer, slide-guide array, and case back assembly for vertical implementation of mechanical logging device.

Alternate Mechanical Embodiment—FIGS. 4 to 6

FIGS. 4A and 4B show an illustrative example plan view and bottom view, respectively, of the alternate (vertical) implementation of the mechanical logging apparatus in the present invention. The example logging device is designed to provide a means of logging information relative to commercial television programs recorded on a home-use VCR. The information logging capability this apparatus provides includes subject, duration, and location on the tape of the material recorded, within the limits of the example tape cassette and VCR setting. The example device is based on the use of a RCA Corporation VHS VCR using a T-120 video cassette and VCR setting of SLP. Further details pertaining to specifications are discussed later herein.

Shown in FIGS. 4A and 4B, the logging apparatus consists of a thin rectangular case 10 having dimensions approximately 7.3 inches in length and 4.0 inches in width. Case thickness is approximately 120 mils for this example, and is considered the minimum practical thickness to maintain desired case rigidity. These dimensions are purposely chosen to provide plan view measurements approximating those of a standard video cassette tape, so as to allow storing the logging device with or within the video tape container. A comparable logging device designed for use with audio-taped material, for example, would have preferred plan dimensions of approximately 4.0 inches in length and 2.5 inches in width. Minimum thickness is desired both to provide rigidity of the apparatus during operation and permit storage within the associated video tape cassette box, if desired. In the event a tape storage box cannot accommodate the thickness of case 10, the apparatus may be stored conveniently with or attached to the associated video tape container.

FIG. 4A, plan view, shows the front of the apparatus, which comprises a panel face 12; a display window 14; icon key 22, FIG. 4C, and VCR, tape, and setting specifications 24. FIG. 4D. The panel face 12 provides the definitions of the output display means and presents conditions peculiar to tape recorder model and operational setting, including recording time in half-hour intervals, counter reading, and number designation of a given time slot. Display window 14 provides a means of viewing the current status of a given time slot by observing the visible markings on the upper surfaces of slides 18 below.

There are several methods of identifying media-taped material subject category, including descriptive words, mnemonics, numeric codes, abbreviations, symbols, or icons. Icons are selected in the alternate mechanical embodiment because they are readily adapted to the small size requirements of the configuration and provide easily remembered associations with the recorded material. Icon key 22 defines the two categories of icons: state and subject. State icons define the state of the time slots; that is, whether the time slot is available for receiving recorded material or used for continuation of active subject material. Subject icons are designed to identify different categories of TV program which a user might record. A total of twelve subject icons is used to fit in available length of slide 18 (FIG. 6D), be easily interpreted through display window 14, and meet spacing requirements between icons on slide 18. A subject icon named "miscellaneous" is included to accommodate subject material which may not be covered by other available icons. The blocked area labelled "SPECIFICATIONS" defines VCR, tape, and setting specifications FIG. 4D. Different specifications apply for different recording conditions, depending on VCR counter mechanism design, type video cassette tape selected, and VCR recording speed setting. The alternate embodiment is based on use of a RCA Corporation VHS VCR, a T-120 tape cassette, and a VCR recording speed setting of SLP. These specifications are chosen based on personal experience and the likelihood that these conditions most frequently apply.

For example, although counter mechanisms may not be standardized to the RCA Corporation design, most are likely to conform. Also, this selection of cassette and VCR setting is more likely to be used than alternates, because all standard tape cassette designs (T-60, T-120, and T-160) and speed settings other than SLP for the T-160 will result in shorter total recording times. Shorter recording time lessens the difficulty of tracking tape content and, thereby, reduces the need for a logging device. With slight modifications, the example mechanical embodiment can be adapted to alternate specifications, such as the use of a T-160 cassette and LP or SLP speed setting. The apparatus can be used without modification if the VCR has a time-based counter design. In addition, a more universally applicable design is discussed in the section titled "Preferred Electronic Embodiment".

FIG. 4B, bottom view, shows the back of the apparatus, which presents blocked areas defining instructions 26, FIG. 4E, and icon key 22, FIG. 4C, blocks, key 22. Also visible are slots 16, slides 18, and tabs 20. Each tab 20 has affixed to its upper surface, in sequential order, a number corresponding to the time slot locator 12c on panel face 12. Instructions 26 are discussed in detail in the section titled "Operation". Icon key 22 on the back of the apparatus is identical to that on the front. It is placed on both sides of the device to enhance availability during both input and output. Note that input means and output display means are separated in the alternate embodiment; whereas, both are found on the front of the preferred embodiment (FIG. 1A).

FIG. 5 shows a plan view of the combined case front 10b, window-spacer 28, slide-guide array 32, and case back 10a assembly for the alternate embodiment of the mechanical logging device. All four components have outside dimensions corresponding to those described for case 10. The case front 10b is made of opaque material, has a thickness of approximately 30 mils, and has twelve rectangular openings arranged along the vertical centerline. These openings are also centered on horizontal slots in slide-guide array 32 beneath. Each opening constitutes a display window 14. The slide-guide array 32 is made of opaque material and has a thickness of approximately 62 mils. The horizontal slots are designed to receive slides 18 (FIG. 4B). A layer of clear material approximately 8 mils thick, window-spacer 28, is mounted between case front 10b and slide-guide array 32. Finally, case back 10a is placed behind slide-guide array 32. Case back 10a is made of opaque material, is approximately 20 mils thick, and has twelve horizontal slots 16 centered on the horizontal slots in slide-guide array 32. Case back 10a receives tabs 20, which protrude through narrow slots 18, and instructions 26, FIG. 4E, and icon 22, FIG. 4C, blocks, as depicted in FIG. 4B. Assembly of components shown in FIG. 5 make up case 10.

Figure 6B:
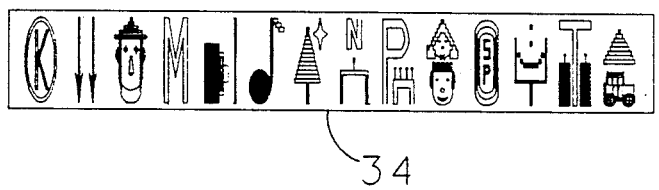
FIG. 6B is a plan view of icon strip for vertical implementation of mechanical logging device.
Figure 6C:
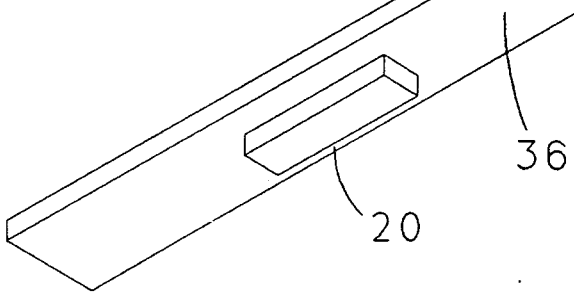
FIG. 6C is an isometric view of combined slide base and tab assembly for vertical implementation of mechanical logging device.
Figure 6D:
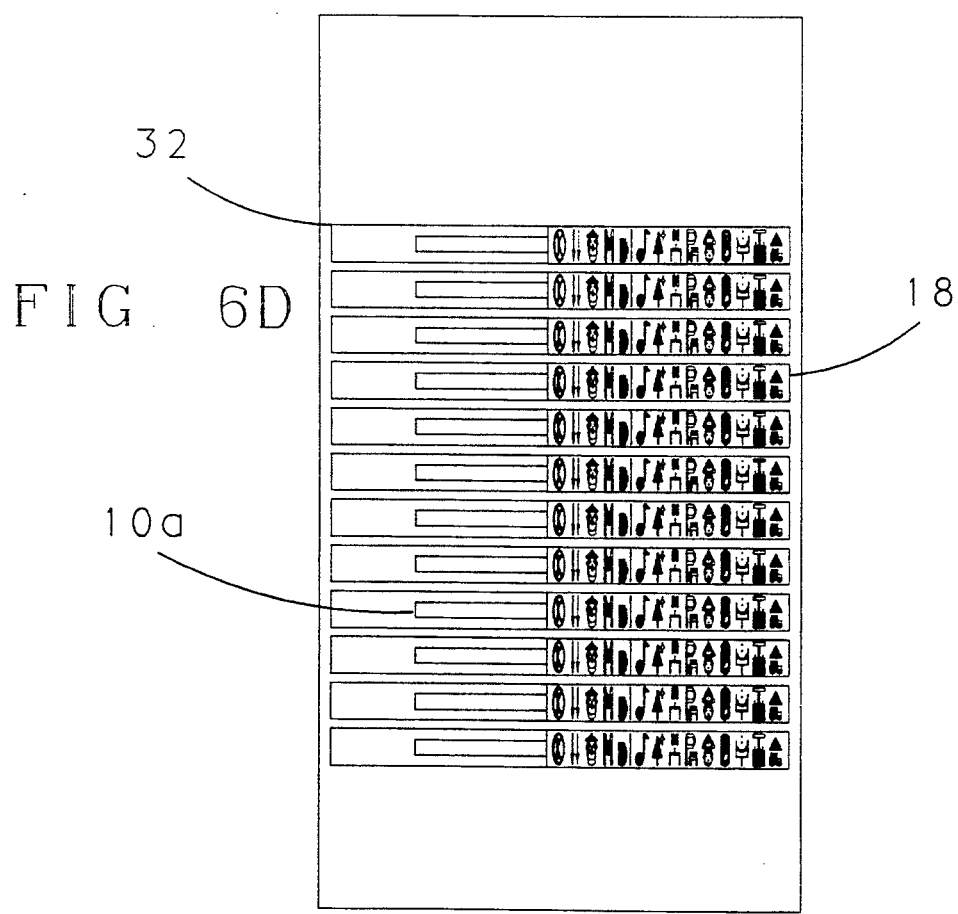
FIG. 6D is a plan view of combined slides, slide-guide array, and case back assembly for vertical implementation of mechanical logging device.
Figure 6A:
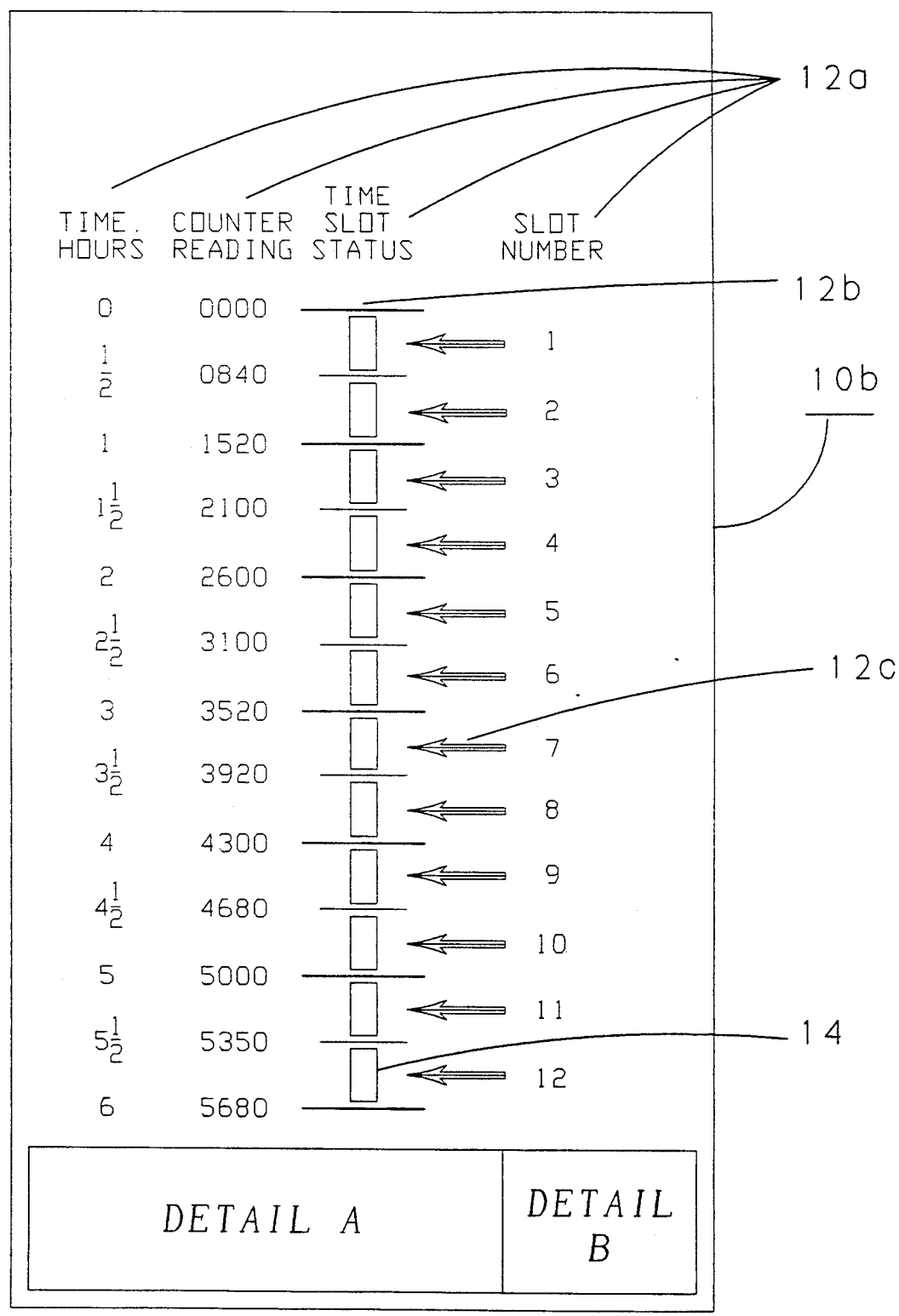
FIG. 6A is a plan view of combined panel face and case front assembly for vertical implementation of mechanical logging device.

FIG. 6A shows a plan view of the combined panel face 12 and case front 10b assembly. Components of the panel face 12 are labels 12a which define data output areas, division lines 12b which demark the boundaries of numbered time slots, and time slot locators 12c which locate the appropriate display window for a given time slot. Division lines 12b are alternating dark and light lines to distinguish full-hour from ½-hour time intervals. A clear area at the top of panel face 12 is available for a name or trademark. Panel face lettering is affixed by using any of a number of techniques, including silk-screening, printing, embossing, photoengraving, or decalcomania, depending on apparatus material and cost objectives. Silk-screening is recommended as the most economical and durable process to use. Case front 10b receives markings for labels 12a, division lines 12b, and time slot locators 12c.

Components of slide 18 are shown in FIGS. 6B and 6C. FIG. 6B shows the icon strip 34 which is affixed to the upper surface of slide base 36. Icon strip 34 is prepared using any of a number of software packages having capability to create customized fonts or icons; for example, Generic CADD 3.0, a trademark of Generic Software, Inc., Redmond, Wash. 98052. Spacing of state and subject icons on icon strip 34 is critical, to allow full visibility of an icon through display window 14 (FIG. 4A) without overlap for all, including extreme, positions of slide 18 (FIG. 4B). A reduction in the aspect ratio of icons on icon strip 34 for the alternate embodiment versus those for the preferred embodiment (FIG. 3B) is necessary to accommodate the narrower overall width of the alternate embodiment. Dimensions of icon strip 34 are 2.0 inches long by 0.30-inch wide. FIG. 6C is an isometric bottom view of combined slide base 36 and tab assembly 20. Slide base 36 has tab 20 attached, on its centerline. Slide base 36 is 2.0 inches long, 0.30-inch wide, and 1/16-inch thick. Tab 20 is 0.125-inch wide, 0.50-inch long, and 1/16-inch thick. Slide base 36 is fabricated using material obtained from cutting the slots in slide-guide array 32. Twelve slides 18 are installed in slide-guide array 32, having tabs 20 projecting through slots 16.

FIG. 6D shows a plan view of the combined window-spacer layer 28, slides 18, slide-guide array 32, and case back 10a assembly for the alternate mechanical embodiment. The combined assembly of case front 10b and the assembly shown in FIG. 6D constitutes the overall assembly of the alternate mechanical embodiment of the logging apparatus as depicted in FIGS. 4A and 4B. Considering, for example, an apparatus fabricated using vinyl sheet, assembly of the various layers may be accomplished using a high quality vinyl cement.

The primary advantages of the alternate (vertical) implementation of the mechanical embodiment of the logging apparatus, as described in this section, versus the preferred implementation are:

1. Greater overall length of the unit permits a greater number of slides 18 for the same slide width, which increases adaptability to designs requiring a greater number of time slots. For example, support of a T-160 tape cassette and an SLP speed setting requires sixteen time slots.

2. Greater overall length of the unit permits wider slides 18 for the same number of slides, which increases legibility of icon strip 34 even though icon character aspect ratio is required to be reduced.

3. Narrower width of case 10 is of a size and shape to more conveniently fit into one hand of the user during operation.

A comparison of the relative advantages and disadvantages of the horizontal and vertical implementations, results in the selection of the horizontal configuration as "preferred" for design conditions stated herein.

DESCRIPTION (CONTINUED)

Electronic Embodiment—FIG. 7

Figure 7A:
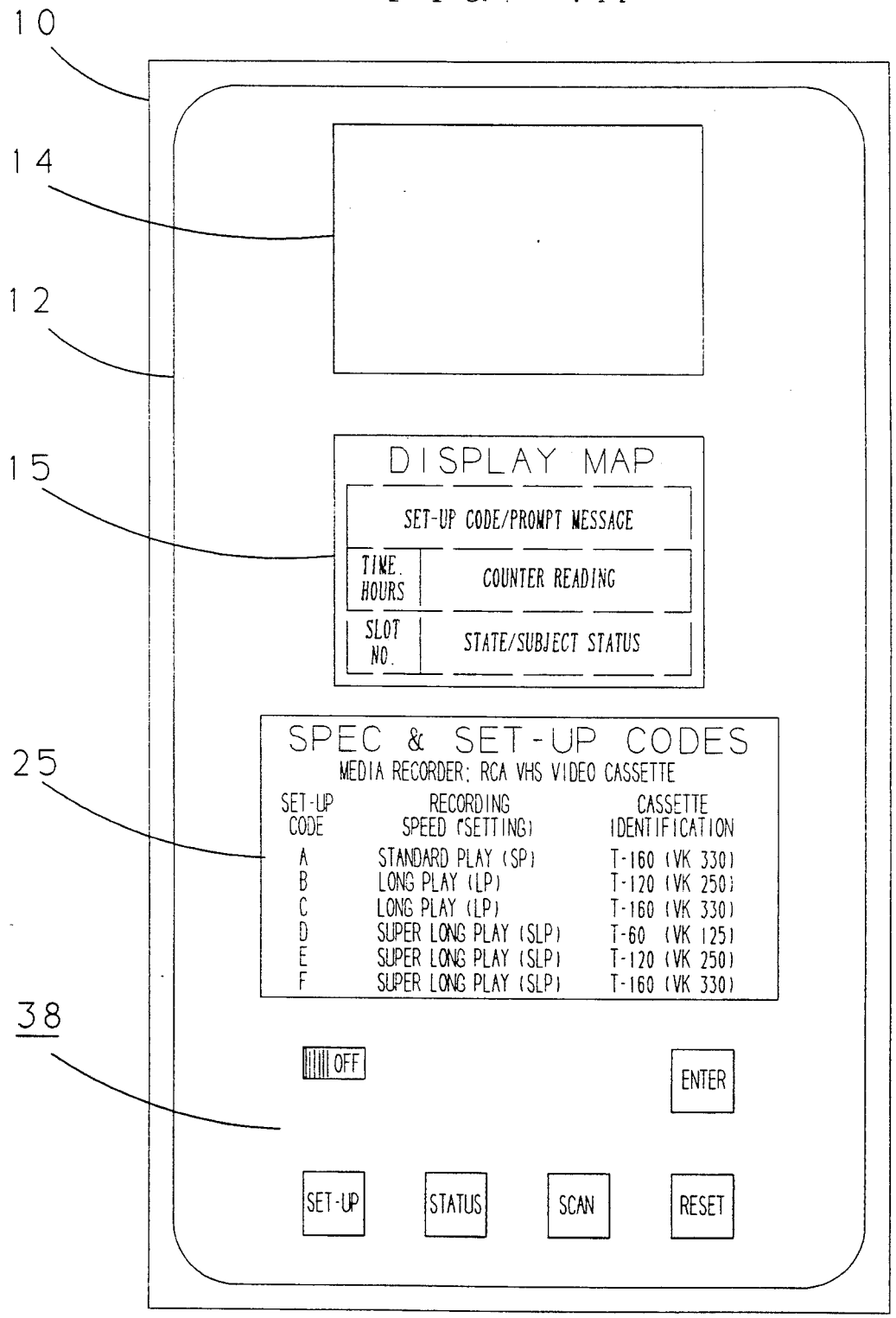
FIG. 7A shows an illustrative example plan view of electronic implementation of logging device in accordance with the present invention.
Figure 7B:
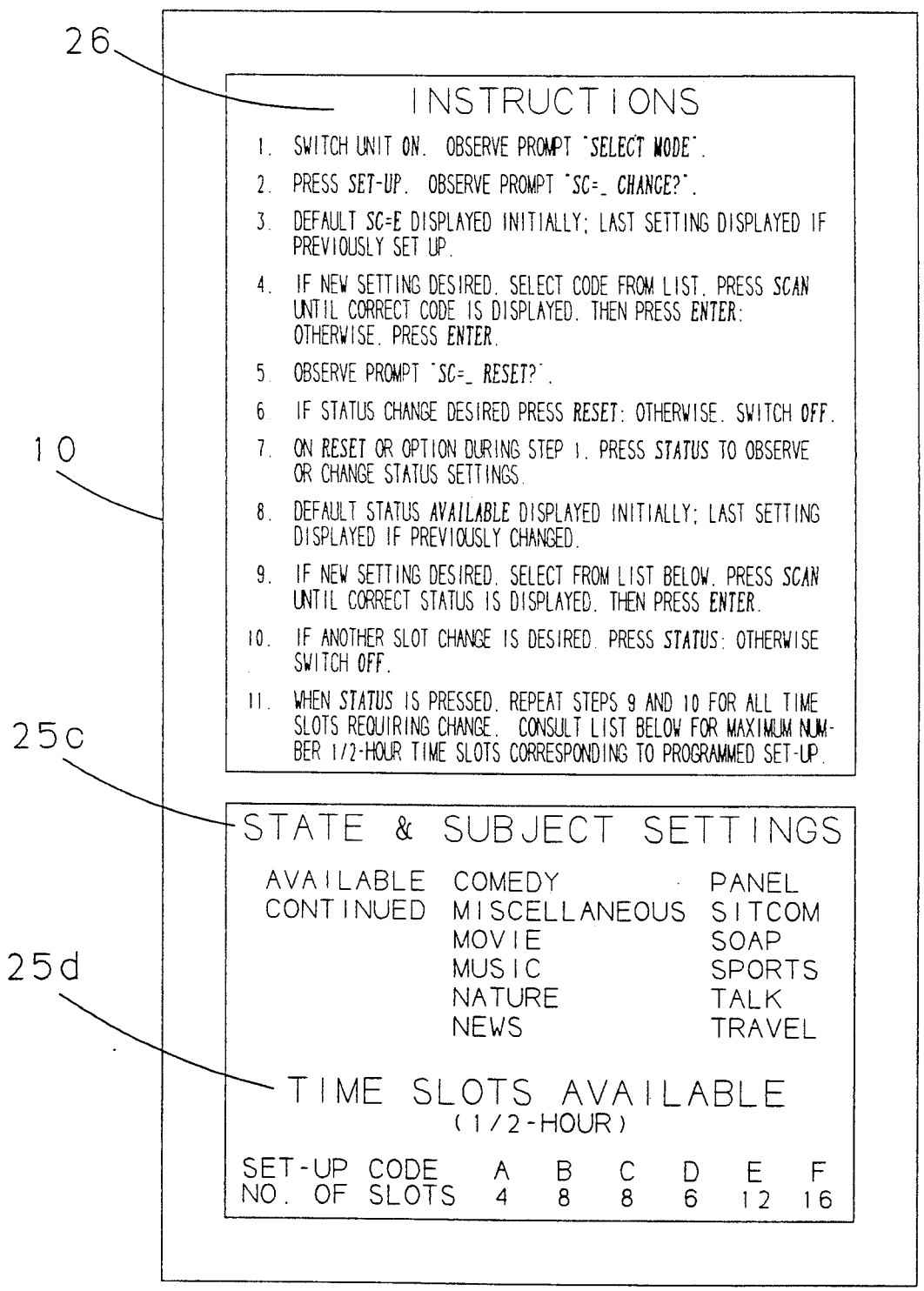
FIG. 7B shows and illustrative example bottom view of electronic implementation of logging device in accordance with the present invention.

FIGS. 7A and 7B show an illustrative example plan view and bottom view, respectively, of the electronic embodiment of the logging apparatus in the present invention. The information logging capability this apparatus provides includes subject, duration, and location on the tape of the material recorded, in order to facilitate later retrieval. This embodiment also permits the selection of one of a multiplicity of set-up codes. These codes program the apparatus to accept information using alternate video cassette tapes and/or recording speed settings. In this respect, the electronic embodiment is more universally applicable to varying conditions of use than the mechanical embodiment. The example device is designed to be functional for all video cassette tapes (T-60, T-120, and T-160) and recorder speed settings (LP, SP, and SLP) available in the use of an RCA Corporation VHS VCR.

An RCA Corporation VHS VCR is selected based on personal experience and the likelihood that, even though VCR counter mechanisms may not be standardized to the RCA Corporation design, most designs will conform. In the event a different counter mechanism design dictates alternate design parameters (e.g., time-based counter or different counter readings for a given recording time) the apparatus is easily modified in production to conform. Similarly, the example design is readily adaptable to other applications, such as for use with audio-taped material.

Shown in FIGS. 7A and 7B, the logging apparatus consists of a thin rectangular case 10 of a size and shape to fit conveniently in one hand of the operator. Dimensions of case 10 are 5.0 inches in length, 3.0 inches in width, and approximately ⅜-inch in thickness. Unlike the mechanical embodiment, the controlling factor in dimension selection is convenience of long term use in a manner similar to a TV remote controller. For the example mechanical embodiments, size dictates for legibility, data storage requirements, and a desire to simulate the dimensions of a standard tape cassette for combined storage are controlling.

FIG. 7A, plan view, shows the front view of the apparatus, which comprises a display window 14, panel face 12, display map 15, recorder specification and set-up codes 25, and keyboard 38. Display window 14, a component of liquid crystal display (LCD) 14c, is approximately 1.0-inch in width. Below display 14c on panel face 12, the area is partitioned into three zones: display map 15, a block labelled "SPEC & SET-UP CODES" 25, and keyboard 38. Display map 15 diagrams for the use of the operator the types of information displayed in the three read-out areas of the LCD. Recorder specification and set-up codes 25 likewise defines (1) the type of recorder the apparatus is designed to accommodate and (2) a multiplicity of set-up codes and their corresponding recorder speed settings and tape types. Keyboard 38 comprises the power switch and keys, as indicated, which are used to set-up the apparatus for desired use conditions, store identifying data regarding media-taped material following tapings, and command the apparatus during information retrieval.

FIG. 7B, bottom view, shows the back of the apparatus, which presents blocked areas defining (1) instructions 26 and (2) state and subject settings 25c, and time slot availability list 25d. Instructions 26 are discussed in detail in the section titled "Operation". There are several methods of identifying media-taped material subject category, including descriptive words, mnemonics, numeric codes, abbreviations, symbols, or icons. For the electronic embodiment, single word descriptions are selected, as space limitations are not as critical as for the mechanical embodiment. Although icons could be used, their use in this case would require more electronic/display complexity with very little, if any, operational advantage, state and subject settings 25c are given in the blocked area having a corresponding label. State settings define the state of the time slots; that is, whether the time slot is available for receiving recorded material or used for continuation of active subject material. Subject settings are designed to identify different categories of TV program which a user might record. A total of twelve subject settings is provided, although this number could be increased without difficulty. A subject setting named "miscellaneous" is included to accommodate subject material which might not be covered by other available settings.

The number of one-half hour time slots available for each set-up code is given by time slot availability list 25d. There is a direct relationship between the time slot availability list 25d and recorder specification and set-up codes 25, as determined by the inherent design of the recorder, the speed setting, and tape length. These factors also affect associated counter readings.

Figure 7C:
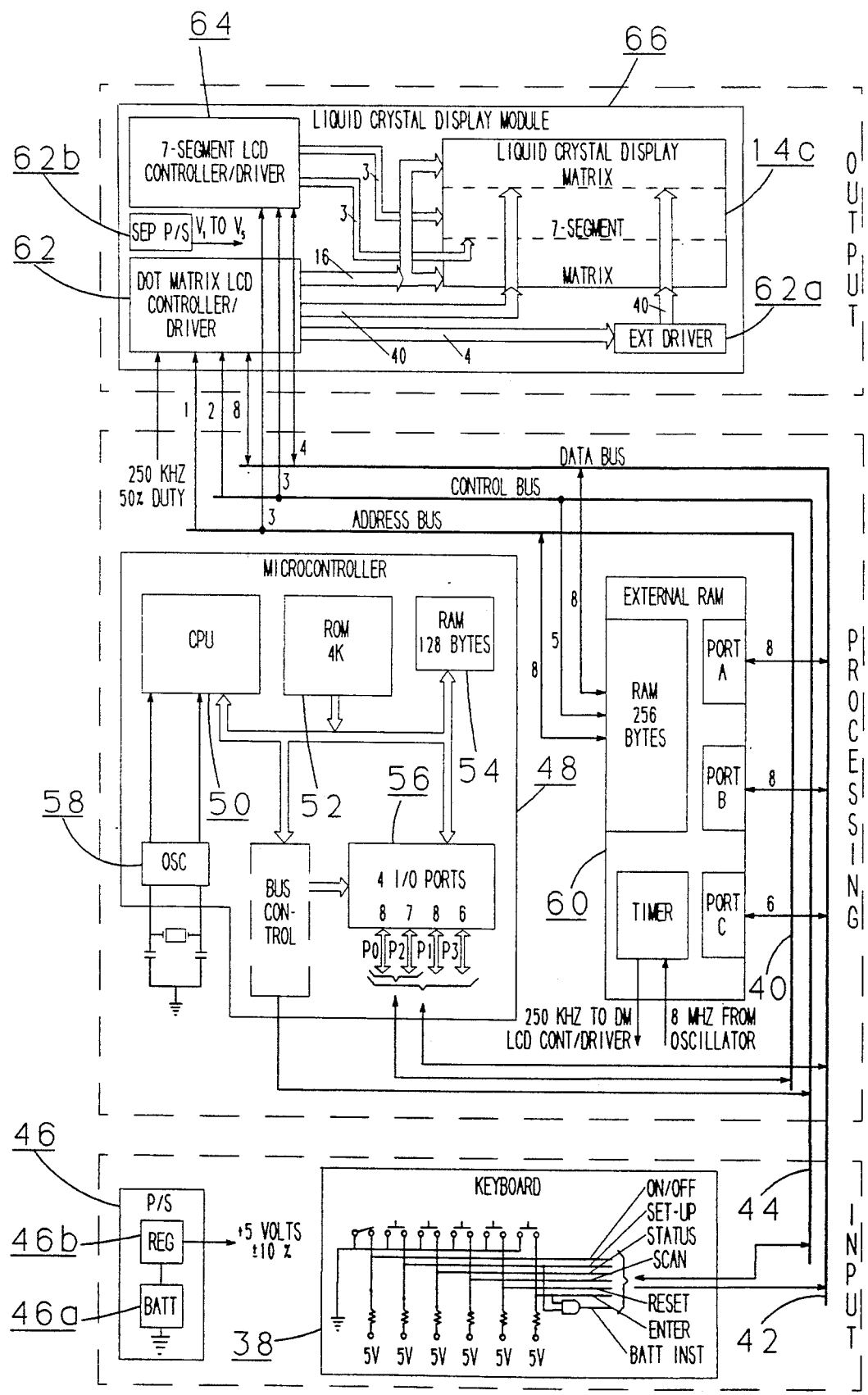
FIG. 7C is a circuit block diagram for electronic implementation of logging device.

FIG. 7C is a circuit block diagram for the electronic embodiment of the logging apparatus. The apparatus architecture conforms to the classic architecture of digital processing systems in that overall hardware complement is subdivided into three categories: (1) input, (2) data processing, and (3) output. Also, conventional terminology is applied with reference to the address bus 40, data bus 42, and control bus 44, where "bus" refers to a common set of conductors shared by hardware elements in the course of executing instructions, directing data flow, or applying control signals. Additional features are included in the design depicted in FIG. 7C to tailor the hardware to the desired application.

The most significant tailoring feature pertains to the selection of the core element; that is, the data processor. It is apparent from a review of the requirements of the apparatus, defined by way of example, that mathematical capability requirements are essentially negligible. There is no requirement for complex manipulation of equations, multiplying, dividing, etc. as, for example, there is for scientific calculators. Some addition, subtraction, and shift operations are necessary during instruction processing, which are comparatively easy to accomplish. Control functions, such as read, write, I/O, memory access, and ready signals are, therefore, the most important considerations. A microcontroller is a type of data processor specifically designed to accommodate an application in which control functions predominate. Generic characteristics of a microcontroller which support its selection for this apparatus include low cost, on-chip ROM and RAM, 8-bit processing, bidirectional I/O, improved instruction set, and single nominal 5Additional features are available and are discussed later herein.

Power supply 46 provides normal supply voltage of +5.0 volts DC, plus or minus 10 percent, to all active (semiconductor/integrated circuit), passive (discrete resistor/capacitor), and display electronics. Power supply 46 is driven by a standard 9-volt dry cell battery 46a, and has the necessary voltage regulator 46b circuit (usually zener diode type) to adjust the unregulated battery voltage to provide supply voltage having the required level and quality. An automatic power shut-off circuit is included to automatically shut off power if no keyboard input is provided within approximately 30 seconds, while power switch is ON. A dedicated circuit supplies power to external random access memory (RAM) 60, even while power switch is OFF during normal operation.

As shown in FIG. 7C, keyboard 38 design requirements are relatively elementary compared with many digital devices which embody numerous keys. Generally, keyboards having more than eight keys are implemented using a matrix design in which rows and columns are successively scanned to identify which key is pressed. Matrix design reduces the number of input lines from the product of number of rows and columns (each key separate) to the sum of rows and columns. For the design by way of example, only seven input lines are required: these are for power ON, keys SET-UP, STATUS, SCAN, RESET, ENTER, and SET-UP/ENTER keys together. The last command is required to insert a special code only when the battery 46a is installed as discussed in Operation. Seven dedicated input lines are more easily implemented in the present design than a 3×3 matrix, which would be the smallest matrix keyboard to handle seven inputs.

Keys act as normally open, single-pole, single-throw switches in the same manner as the ON-OFF switch. Pull-up resistors (typically 10 k-ohms) are installed in the input lines to maintain HIGH on a key (or switch) when open and to reduce the effects of noise. Also, the software program delays program execution about 0.25-second to be certain key bounce is overcome and user action is completed. Pressure sensitive keys which react to discrete force on a specifically marked area of the console are also a possible choice. This type keyboard reduces the risk of accidental key actuation, which may cause data loss or error. However, such devices normally require supporting the unit on a flat surface before pressing, which has some disadvantage during anticipated use conditions. Input requirements in the example design are purposely constrained in the interest of cost, although the design is readily adaptable to greater input capability. For example, including alphabetized input keys and appropriate software/hardware would permit inserting customized descriptions of subject categories. In this event, a matrix keyboard designed to conventional technology is the optimum choice.

In the center of FIG. 7C, the important constituents of the data processor are shown. Core element of the data processor is a monolithic microcontroller 48. Numerous families of microcontroller are available from major microcircuit manufacturers which, although fundamentally designed to optimize for control functions, differ somewhat in specific design features. Further, each manufacturer provides optional capabilities within his proprietary design and process. The design presented by way of example in FIG. 7C is based on use of Intel 8051 microcontroller, which is one of the MCS-51 family of 8-bit control-oriented microcomputers. MCS-51 is a trademark of Intel Corporation, 3065 Bowers Avenue, Santa Clara, Calif. 95051. The 8051 microcontroller is high-density metal oxide semiconductor (HMOS). A simplified block diagram of microcontroller 48 architecture is included, as most elements important to the discussion are encompassed by the basic structure of the part. Significantly, these elements are central processing unit (CPU) 50, read-only memory (ROM) 52, internal random-access memory (RAM) 54, input/output (I/O) ports 56, and oscillator 58. One important feature of the 8051 is the option to add external ROM and/or RAM without loss of core on-chip capabilities. Accordingly, an external 256 byte static RAM 60 device is installed to store current set-up and status data at all times, including power OFF periods, during normal operation.

The CPU 50 comprises an 8-bit arithmetic logic unit (ALU) and associated registers, which perform the necessary movement of data and instructions in response to the system program stored in ROM 52. Required registers used in conjunction with the ALU, in the 8051, are several of Special Function Registers (SFRs), which are a part of internal RAM 54. Some of these registers as well as the ALU are bit-addressable, an important feature of the 8051 architecture which enhances its control application. Even though arithmetic calculations are minimal in the current application, a CPU is still required to perform logic functions, including conditional branching decisions and Boolean (AND, OR, exclusive OR, NOT) operations. The 8051 logical instruction list has been augmented specifically to optimize CPU use in control applications. This fact and bit addressable registers in RAM 54 eliminates the need to rely on the accumulator register in CPU 50 in many instances; thereby, improving efficiency and speed.

The ROM 52 is a 4K byte mask-programmable memory which stores the system program instructions, including, for example, display driver, and look-up tables for keyboard decoding, set-up codes, and status terms (FIG. 7A). Software is written in assembly language utilizing the Intel-provided 8051 instruction set. Before the assembly language code can be used in CPU 50, it is converted to machine code using a commercial assembler software package such as ASM-51, available from the manufacturer. Once machine code is available, completely debugged, and determined as final, it is furnished to the manufacturer for design of the production mask used in ROM 52 fabrication. As this is an relatively expensive process to repeat, some consideration to using the extended ROM capability of the part during development, to ensure fault-free code, is desirable. In this event, an erasable programmable read-only memory (EPROM) could be used. For production, however, there is no requirement for an EPROM, as the apparatus is pre-programmed for a fixed set of operating conditions. A distinctive feature of microcontroller 48 memory organization is that separate and distinct addressing mechanisms, control signals, and functions apply for ROM 52 as compared to internal RAM 54. For example, CPU 50 cannot execute program instructions out of internal RAM 54. This separation, in turn, contributes to optimization of control applications.

Internal RAM 54 has 128 bytes of memory space, and low byte (sufficient for 256 bytes) of RAM 60 address, time-multiplexed with the data byte being written or read. Port 2, normally used to output RAM 60 address high byte, sends the contents of the SFR at all times in this application. All Port 3 pins are multifunctional and serve not only as port pins, but provide for special features, such as RAM 60 read/write strobes and interrupts. Alternate functions of Port 3 are invoked by setting the SFR bit latch to logic "1". Port 1 serves as keyboard interface, as previously discussed.

Oscillator 58 is required to provide AC power at the required frequency and quality level, neither of which are critical for this application, to microcontroller 48. On-chip elements, commonly called "on-chip oscillator", represent the inverting amplifier, which then requires the addition of an external clock source. The driving source may be either a crystal or a ceramic resonator. Ceramic resonators operate at a wider frequency tolerance than crystals, but are less expensive. For the example apparatus, a 8 MHz ceramic resonator is recommended, as cost is determinant. Careful matching of external capacitor values in the circuit with resonator performance is necessary to optimize start-up time and frequency stability.

There are two reasons for adding external memory: (1) a requirement for more RAM than the 128 bytes furnished by internal RAM 54, and (2) a requirement to maintain RAM power during periods of non-use. Limiting the size of external RAM 60 is mandatory to meet external envelope size requirements and cost objectives. Maximum number of bytes required for storage of current set-up and status data, including status terms and all prompts, is 245. This is determined as shown in Table I:

TABLE I

Determination of External RAM Size Requirement

| DISPLAY LINE NO. | MAXIMUM REQUIREMENTS | | | |
|---|---|---|---|---|
| | CHARACTERS STORED/LINE | REPEATS EACH | BYTES REQUIRED | COMMENTS |
| 1 | 29 | 1 | 29 | Prompt terms (4) incl spaces; all alphas |
| 2* | 1 | 9 | 9 | Whole hour time digits |
| 2 | 3 | 8 | 24 | Half-hour time digits & decimals |
| 2 | 4 | 16 | 64 | Counter reading digits |
| 3 | 23 | 1 | 23 | Time slot digits |
| 3* | 6 | 16 | 96 | Abbreviate status terms > 6 letters; all alphas |
| | DISPLAY MAP TOTAL | | 245 | |

*Fixed field spaces implemented in software is established in this example as the primary working memory; with current set-up and status data storage relegated to external RAM 60. Internal RAM 54 comprises four banks of eight data registers each, 16 bytes of bit-addressable space, 80 bytes of scratch-pad memory, plus 21 SFRs. Approximately one-half of the SFR locations are also bit-addressable. These include registers that function as I/O ports 56, accumulator, and program status word, and registers for interrupt functions. In addition to bit-addressability, any SFR location may be addressed by specifying its name (e.g., SP addresses stack pointer). Execution time for data transfer instructions that access internal RAM 54 vary from 1 to 3 microseconds, depending on the instruction, with an 8 MHz oscillator.

Microcontroller 48 has four 8-bit I/O ports 56, Ports 0 through 3. All four ports are bidirectional and each has a latch (SFRs P0 through P3), output driver, and input buffer. The output drivers of Ports 0 and 2 provide accesses to external RAM 60. Port 0 provides the Status terms "AVAILABLE", "CONTINUED", and "MISCELLANEOUS" are abbreviated for both memory conservation and display compatibility. As pertains to power, a dedicated power circuit is required and readily provided, as the 8051 does not have the optional power-down mode for internal RAM 54, available in other MCS-51 devices.

An alternate to use of external RAM is selection of the 80C52 microcontroller, which is a complementary high-density metal oxide semiconductor (CHMOS) version in the MCS-51 family of microcontrollers. The 80C52 provides an optional power-down mode which maintains internal RAM power during periods of non-use. This device has 256 bytes of internal RAM and provides parallel address space between the upper 128 bytes and the SFRs. Effectively, therefore, total addressable RAM space equals that of the 8051 with 256 bytes of external RAM, or 384 bytes. However, reduced availability of ports and excess capability and cost of the 80C52 compared to the 8051 are deemed sufficient reasons to select the 8051 and add external RAM.

The part selected for this application is the Intel 8155 256 byte (256×8) static RAM. This device includes three I/O ports 56a, timer, and programmable command register. The command register defines port usage and timer operating mode. Interfacing the 8155 to the microcontroller is facilitated by utilizing the Port 0 multiplexing capabilities of the 8051, eliminating the need for a separate address latch integrated circuit. Although a substantial number of lines in I/O ports 56 are required to interface, a net gain in I/O lines is realized due to the additional RAM I/O ports 56a. Timer output of the 8155 is readily used to supply a 250 KHz clocking signal to dot matrix controller/driver 62.

Special peripheral function capabilities (external interrupt control, serial port interface, and timer/counters) of microcontroller 48 are available, but have limited application herein and, therefore, are not shown in FIG. 7C. An interrupt control function, which is a "RESET" entered from the keyboard, is necessary however, and is accomplished by imposing a logic "1" on the RST pin of microcontroller 48.

Display elements are shown at the top of FIG. 7C. The low power consumption, voltage, and cost requirements and small size adaptability of liquid-crystal types of display, in general, make the LCD a primary choice for the apparatus presented by way of example. Disadvantages of LCDs compared to competing technologies, such as low brightness, operating temperature range, resolution, and speed, in general are not limiting in this application. Reference to FIGS. 7A, and 8C through 8E, and accompanying discussions, indicates the important physical requirements. These requirements are: (1) overall display dimensions, 1.0"×1.5", (2) 3 rows, (3) 12 alphabetic characters maximum top row, (4) 7 numeric characters maximum center row, (5) 9 alphanumeric characters bottom row, (6) 2 fields each row, and (7) 1 space each row, generally between fixed fields. Note that a decimal point is included with associated digit in numeric display character count.

Dot matrix LCDs are ideally suited to displaying alphabetic characters of high quality, compared to segment types. Although 14- and 16-segment LCDs are available and capable of displaying alphabetic characters with reasonable quality, interface complexity is a limiting consideration. Another disadvantage is the relative shortage of controller/driver devices for 14- and 16-segment LCDs, compared to those for 7-segment LCDs. Accordingly, a minimum capability display incorporating 12-character and 9-character dot matrix LCDs for top and bottom rows, respectively, and a 7-character 7-segment LCD for middle row is recommended. It is probable an off-the-shelf LCD (or separate displays) meeting all the stated requirements is not available, and a custom-made device is required. Numerous potential suppliers of LCD are available, at least one of which entertains orders for custom devices on submittal of artwork and other pertinent requirements. This supplier is AND, 770 Airport Blvd., Burlingame, Calif. 94010.

A potential option to LCD usage is light emitting diode (LED) type displays, either segment or dot matrix. However, LEDs entail the same difficulties in implementing alphabetic characters using segmented types, and size limitations prohibit use of dot matrix types. In addition, cost, complexity, and power consumption are significantly greater, compared to an LCD.

Display 14c, proposed as baseline, is a twisted nematic (TN) LCD, which is the oldest and most common type. It requires AC drive voltage, as DC or a DC component over 25 millivolts causes catastrophic failure of the liquid crystal compound. Frequencies lower than 30 Hz increase flicker; frequencies higher than 100 Hz increase power consumption and "ghosting". Common anode type versus common cathode type LCDs and CMOS interface logic are preferred.

Another consideration in selecting LCDs involves driving method. The most common type, direct drive, is one in which each element of the display is energized individually. These devices, however, have limitations due to complexity. Difficulty in displaying alphabetic characters is another limitation. Driving waveform, on the other hand, is normally a readily obtainable 50 percent duty cycle, 32 Hz, 5-volt rms square wave. A more universally applicable LCD is the multiplexed type. This type uses an X-Y matrix format, wherein individual common plane (X-axis) and segment plane (Y-axis) elements form interconnected strings. These strings are energized sequentially, allowing a significant reduction in driving circuits. The designated format (e.g., 5×7) denotes the number of segment and common planes, respectively.

The requirement to maintain a low DC component on the LCD, to protect against damage, greatly complicates multiplexing. The result is a considerably more complex waveform requirement than the 32 Hz square wave used in direct drive LCDs. Fortunately, however, a number of manufacturers supply controller/driver devices designed to meet specific market requirements. The resulting overall complexity is greatly reduced using these specialized microcircuits and compatible multiplexed LCDs versus using direct drive. The recommended display, therefore, embodies multiplexed LCDs and controller/driver devices, either identical or similar to existing parts.

Top and bottom row portions of display 14c, together, are similar to dot matrix module type numbers AND491 (AND, a division of William J. Purdy Companies, Burlingame, Calif. 94010) or LM052L (HITACHI America, Ltd., 2000 Sierra Point Pkwy., Brisbane, Calif. 94005-1819), both of which display 16 characters in each of two rows. Corresponding to a number of AND and HITACHI LCD module products, the proposed display has built-in control large scale integration (LSI). It displays minimum required number of characters in a 5×7 matrix format, providing 0.24-inch character height. Excess capability in similar existing products (e.g., custom characters and 160 characters), although not needed for this application, may be applied in expansion, left unused, or deleted in the interest of cost. The center row LCD is similar to AND Part No. FE0204M (single row, four characters, 7-segments, 0.5-inch digit height), except the proposed LCD has seven characters, 7-segments, and an 0.24-inch digit height.

Interface elements are required to control, decode, and move prompts and current set-up and status data, stored in external RAM 60, for display on LCD 14c in the proper context. These elements perform similar functions relative to other memory-display operations. Display 14c is mapped into RAM 60. This technique allows display 14c to be treated as RAM by CPU 50, thereby reducing CPU accesses and increasing overall efficiency. Dot matrix LCD controller/driver 62 and 7-segment LCD controller/driver 64 are the primary interface elements.

The Model HD44780 built-in controller/driver (Hitachi America, Ltd., Brisbane, Calif. 94005), or equivalent, is recommended controller/driver 62. It is a +5-volt, CMOS LSI chip, comprising an 80×8 display data RAM (i.e., 80 characters max), character generator ROM, I/O buffer, two 8-bit registers (instruction and data), output shift registers and latch circuit, timing generation circuit, and LCD driver circuit. The built-in LCD driver circuit provides 16 common signal drivers and 40 segment signal drivers. The latter signal drivers accommodate eight characters per line. For the recommended dot matrix display configuration (2 lines, 12 and 9 characters/line, respectively), a single, Hitachi Model 44100H, external display driver 62a is required, to provide the additional segment signal drivers. Display driver 62a, also a CMOS LSI part, accepts character pattern serial data in two sets of 20-bit shift registers, performs serial-to-parallel conversion, latches these data, and controls the output drivers interfacing characters not accommodated by the built-in driver circuit.

The HD44780 operates using either external or internal clock. This option facilitates use of the timer feature provided by external RAM 60 as a source of 250 KHz oscillator. Also, separate power supply 62b is required to generate the applied voltages used to obtain the complex driving waveforms within the unit. These waveforms are, in turn, sent to the input pins of the top and bottom row dot matrix LCDs in display 14c. Power supply 62b furnishes five voltage levels, utilizing a resistance dividing network similar to that described below for controller/driver 64. Voltage levels required are a function of duty factor, which bears a direct relationship to the number of common planes. For example, a power supply for a controller/driver serving a sixteen-character display has a 1/16 duty factor; whereas, one for an eight-character display has a ⅛ duty factor and different voltage levels. Mathematical relationships are available to establish discrete AC and minimum DC input voltage levels required to obtain waveforms having the required symmetry.

Harris Model ICM 7231 (Harris Semiconductor, 2460 Component Dr., San Jose, Calif. 95112) is recommended controller/driver 64. This CMOS part is an 8-digit, 7-segment, 40-pin dual in-line package (DIP) driver. It uses parallel input, triplex (3×3 multiplexing) output, and requires nominal five volts. The ICM 7231 display driver comprises input data/address latches, data/address decoders, eight sets of segment line drivers with associated latches, chip select circuit, and common line driver. The unused eighth digit driver may be disabled in the interest of utilizing an off-the-shelf part.

The ICM 7231 also has an on-chip display voltage level generator, comprising three equal value resistors in a string. This circuit coupled with an on-chip oscillator supplies all required complex waveforms and timing for common and segment lines for the center row LCD in display 14c, including decimal point (annunciator).

Liquid crystal display module 66 comprises all elements required to perform the output display function, including controller/drivers 62 and 64, external driver 62a, power supply 62b, and LCD 14c.

The primary advantages of the electronic versus the mechanical (both horizontal and vertical) embodiment of the logging apparatus are:

1. It is used for all tape types and recorder speed settings available for a specified media recorder; whereas, the mechanical apparatus is adapted to a specific set of corresponding conditions. This means a single electronic device is suitable for a wide range of use conditions for which multiple mechanical devices are required.

2. It is more durable and, thus, more suitable for long-term, day-to-day, chair-side use, to maintain a log of the current content of a tape for which recording and viewing/auditing are constantly repeated.

3. It is less susceptible to introduction of erroneous information during periods of non-use.

4. It is readily adaptable to increased capabilities, such as storing a greater number of subject categories than the example or providing capability to insert customized descriptions of logged material subjects.

The primary disadvantages of the electronic versus the mechanical (both horizontal and vertical) embodiment of the logging apparatus are:

1. It is considerably more expensive and, therefore, not likely to be used in the large quantities to which the mechanical apparatus is adapted.

2. It is not adapted to storage with the applicable tape cassette for a permanent record of tape content.

3. It does not provide an instantly visible "snapshot" of tape content, as only single time slot information is displayed at one time.

OPERATION

Procedures for operating the three embodiments of my invention, both the horizontal and vertical mechanical and the electronic implementations, are described in this section. Primarily, these descriptions elaborate on instructions 26, which were identified in Description.

Figure 8A:
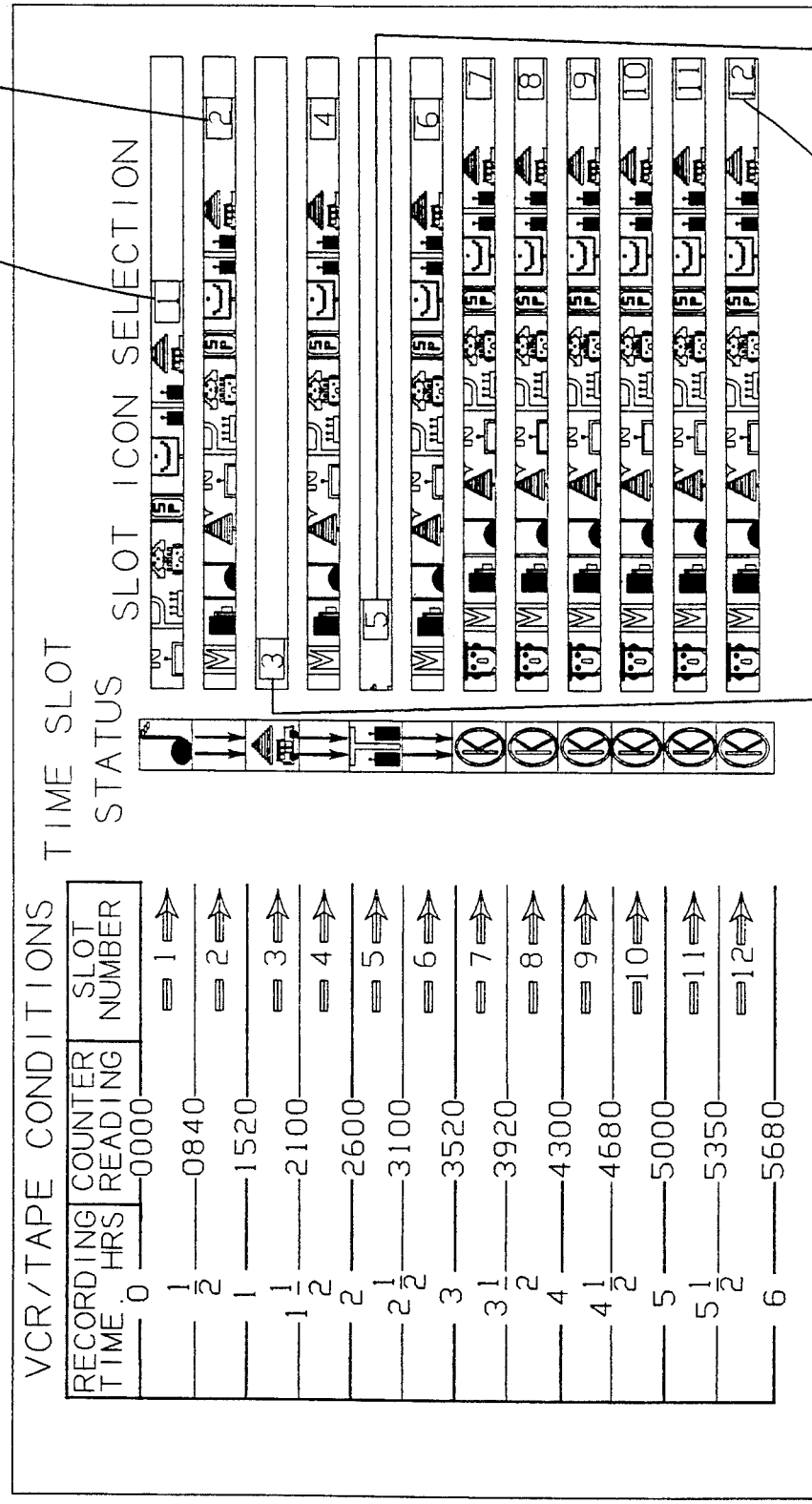
FIG. 8A shows a plan view of horizontal mechanical logging device illustrating selected operational settings of slot status icons.

PREFERRED MECHANICAL EMBODIMENT—FIGS. 1A, 1B, and 8A

First, refer to VCR, tape, and setting specifications 24 found at the right on the back of the apparatus as shown in FIG. 1B. Make certain that stated specifications 24 apply for the recorder, tape type, and speed setting used. If not verified, change tape type and/or speed setting to conform. Also, devices which can be used with other VCRs, tape types, and recording speeds are likely to be available for purchase, if required, during production.

Next, follow instructions 26 found at the top on the back of the apparatus as shown in FIG. 1B:

1. Make sure the counter is set to 0000 at the beginning of tape reel before all taping/retrieval actions. All counter readings on panel face 12, FIG. 1A, are referenced to 0000 under these conditions and, therefore, setting the VCR counter at 0000 anywhere else on the tape will cause significantly different readings to appear on the VCR display, for a given time slot, than those shown on panel face 12. All counter readings are approximate, however, as various mechanical tolerances, environmental effects, and program durations affect the true counter readings for a program start or end.

2. State and subject icons are shown in icon key 22 at the left on the back of the apparatus as shown in FIG. 1B. When the tape is blank, set STATE ICON "available" in the windows of all time slots, as shown in FIG. 1A. Move all slides 18 to the extreme right position, using tabs 20, until slide slot available setting 18e appears in window 14 for all time slots. This setting for time slots indicates that all time slots on the tape are available to receive program audio-video.

3. After taping program, set SUBJECT ICON in status window of appropriate numbered slide 18. Say, for example, a one-hour musical program is taped using a new tape. Referring to FIG. 8A, slide music program setting 18a is made by moving slide 18, time slot "1", to the left until the "music" icon appears in window 14. As the program extends beyond one-half hour, the "continued" icon is set in window 14 by making slide program continued setting 18b, moving slide 18, time slot "2", to the left until properly positioned.

4. Correspondingly, logging the content of the tape reel for the next two hours of taping is accomplished as shown in FIG. 8A. The first example shown is for taping a one-hour travel program, for which slide travel program setting 18c is made for time slot "3" and slide program continued setting 18b is made for time slot "4". Next, an example is shown for taping a one-hour talk show, for which slide talk show setting 18d is made for time slot "5" and slide program continued setting 18b is made for time slot "6". At this point, compare the counter reading on the VCR display with that shown on panel face 12 for the end of time slot "6", which is 3520 (or 3 hours). The number (hours, for time-based counter) displayed should closely agree. Also, FIG. 8A indicates this tape has six additional one-half hour time slots available for future use, as indicated by slide slot available settings 18e.

5. If subject matter has been viewed, use STATE ICON "available" to indicate time slot is again available to receive taped information. This is accomplished by merely moving the appropriate slide(s) to the extreme right position to make the slide slot(s) available setting 18e, with the icon "OK" appearing in window 14.

6. To locate a subject for viewing, rewind or fast-forward (FF) tape reel to appropriate counter reading. For example, to locate the travel program previously recorded before the talk show as described above, first verify that the counter has not been reset to 0000. If the counter has been reset to 0000 at any point on the tape than its beginning, rewind the tape completely and set the counter to 0000. Next, determine the counter reading shown on panel face 12 which corresponds with the beginning of the travel program located in time slots "3" and "4". The correct counter reading is 1520. Assuming it is known the counter has not been reset, rewind the tape from counter reading 3520 until 1520 appears on the VCR display. If the tape has been rewound completely to establish 0000 at its beginning, FF the tape from counter reading 0000 to 1520. The travel program is now ready for viewing, starting at counter reading 1520 (1-hour time interval).

OPERATION (CONTINUED)

Alternate Mechanical Embodiment-FIGS. 4 and 8B

First, refer to VCR, tape, and setting specifications 24 (FIG. 4D). found at the right on the front of the apparatus as shown in FIG. 4A. Make certain that stated specifications 24 apply for the recorder, tape type, and speed setting used. If not verified, change tape type and/or speed setting to conform. Also, devices which can be used with other VCRs, tape types, and recording speeds are likely to be available for purchase, if required, during production.

Next, follow instructions 26 (FIG. 4E). found at the top on the back of the apparatus as shown in FIG. 4B:

1. Make sure the counter is set to 0000 at the beginning of tape reel before all taping/retrieval actions. All counter readings on panel face 12, FIG. 4A, are referenced to 0000 under these conditions and, therefore, setting the VCR counter at 0000 anywhere else on the tape will cause significantly different readings to appear on the VCR display, for a given time slot, than those shown on panel face 12. All counter readings are approximate, however, as various mechanical tolerances, environmental effects, and program durations affect the true counter readings for a program start or end.

2. State and subject icons are shown in icon key 22 (FIG. 4C). at the bottom of both sides of the apparatus as shown in FIGS. 4A and 4B. When the tape is blank, set STATE ICON "available" in the windows of all time slots, as shown in FIG. 4A. Move all slides 18 to the extreme right position, using tabs 20, FIG. 4B, until slide slot available setting 18e appears in window 14 for all time slots. This setting for time slots indicates that all time slots on the tape are available to receive program audio-video.

3. After taping program, set SUBJECT ICON in status window of appropriate numbered slide 18. Say, for example, a one-hour comedy show is taped using a new tape. Referring to FIG. 8B, slide comedy show setting 18f is made by moving slide 18, time slot "1", to the left until the "comedy" icon appears in window 14. As the program extends beyond one-half hour, the "continued" icon is set in window 14 by making slide program continued setting 18b, moving slide 18, time slot "2", to the left until properly positioned.

4. Correspondingly, logging the content of the tape reel for the next five hours of taping is accomplished as shown in FIG. 8B. The first example shown is for taping a three-hour sports program, for which slide sports program setting 18g is made for time slot "3" and slide program continued setting 18b is made for time slots "4" through "8". Next, an example is shown for taping a two-hour movie program, for which slide movie program setting 18h is made for time slot "9" and slide program continued setting 18b is made for time slots "9" through "12". At this point, compare the counter reading on the VCR display with that shown on panel face 12 for the end of time slot "12", which is 5680 (or 6 hours). The number (hours, for time-based counter) displayed should closely agree, provided the counter has not been reset to 0000 at any point on the tape other than its beginning. Also, panel face 12 shows the tape is filled with programs of interest, and there are no time slots available for use at present.

5. If subject matter has been viewed, use STATE ICON "available" to indicate time slot is again available to receive taped information. This is accomplished by merely moving the appropriate slide(s) to the extreme right position to make the slide slot(s) available setting 18e, with the icon "OK" appearing in window 14. This action requires great care to prevent accidental movement of an incorrect slide 18, as slide tabs 20 are located on the back of the alternate embodiment.

6. To locate a subject for viewing, rewind or FF tape reel to appropriate counter reading. For example, to locate the sports program previously recorded before the movie program as described above, first verify that the counter has not been reset to 0000. If the counter has been reset to 0000 at any other point on the tape than its beginning, rewind the tape completely and set the counter to 0000. Next, determine the counter reading shown on panel face 12 which corresponds with the beginning of the sports program located in time slots "3" through "8". The correct counter reading is 1520. Assuming it is known the counter has not been reset, rewind the tape from counter reading 5680 until 1520 appears on the VCR display. If the tape has been rewound completely to establish 0000 at its beginning, FF the tape from counter reading 0000 to 1520. The sports program is now ready for viewing, starting at counter reading 1520 (1-hour time interval).

OPERATION (CONTINUED)

Electronic Embodiment—FIGS. 7, and 8C to 8E

This section describes operating procedures corresponding to those previously described for mechanical embodiments, and also briefly describes electronic circuit operation.

Figure 8C:
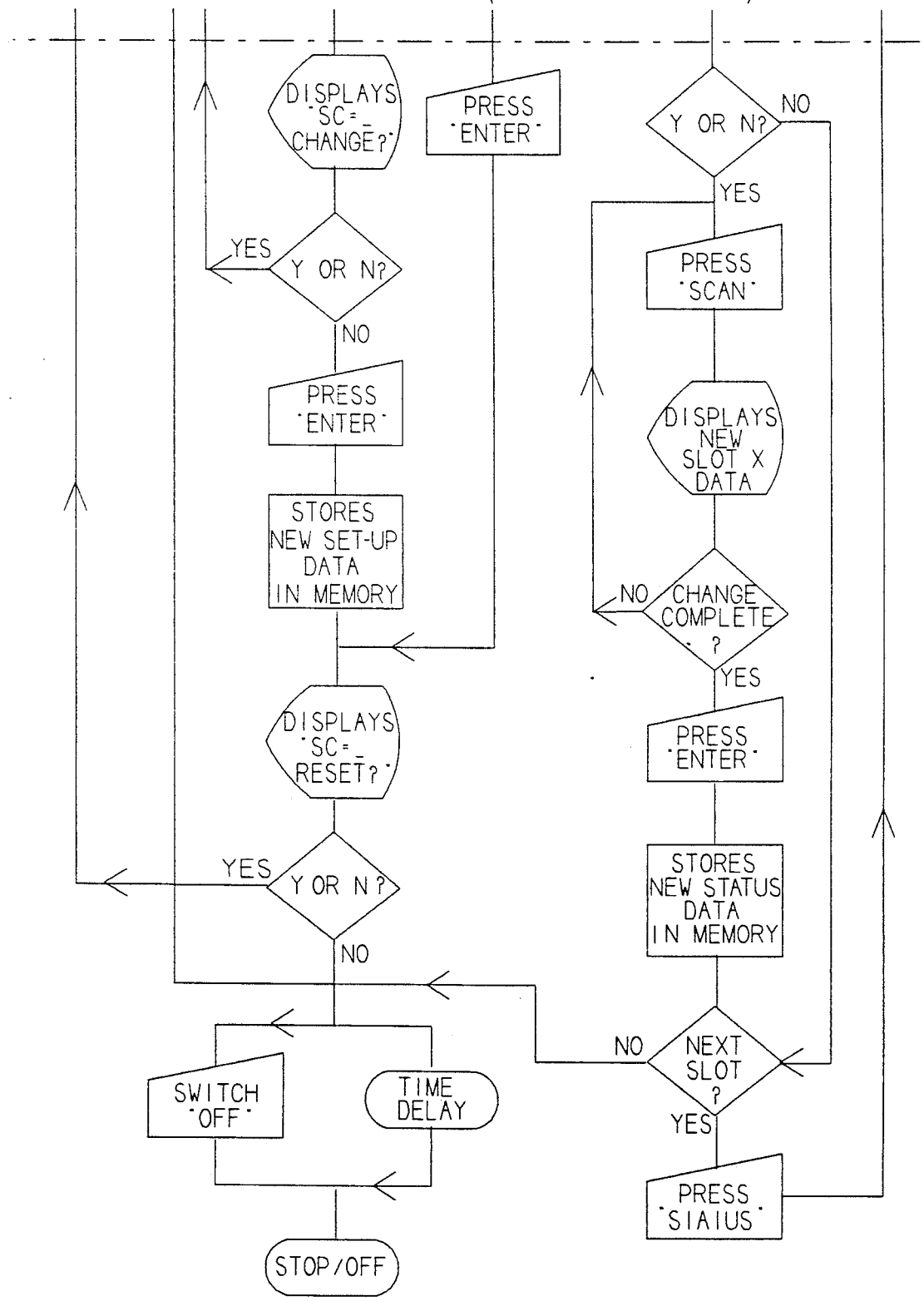
FIG. 8C is a flow chart illustrating operation of electronic implementation of logging device.
Figure 8C:
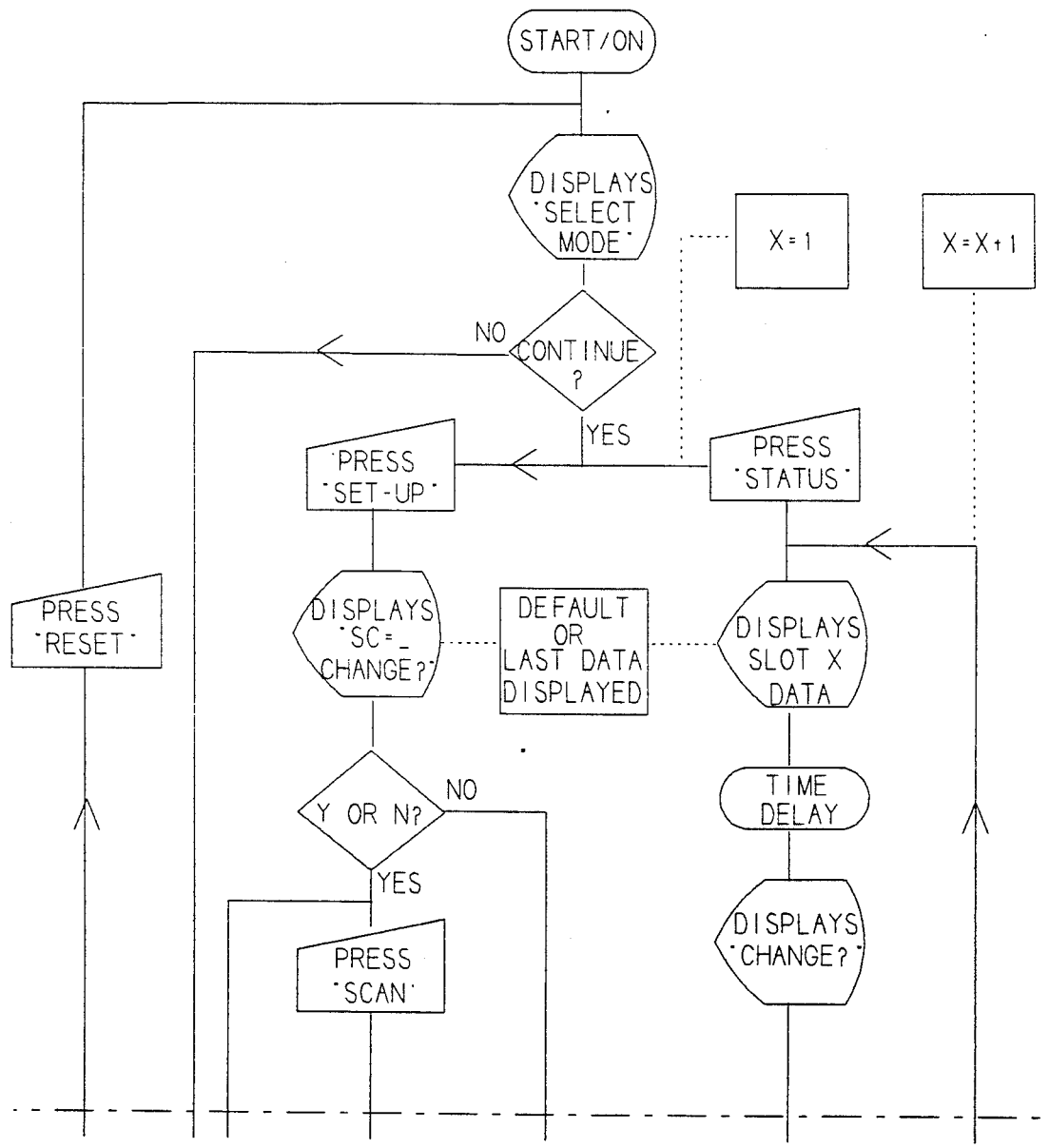
Figure 8D:
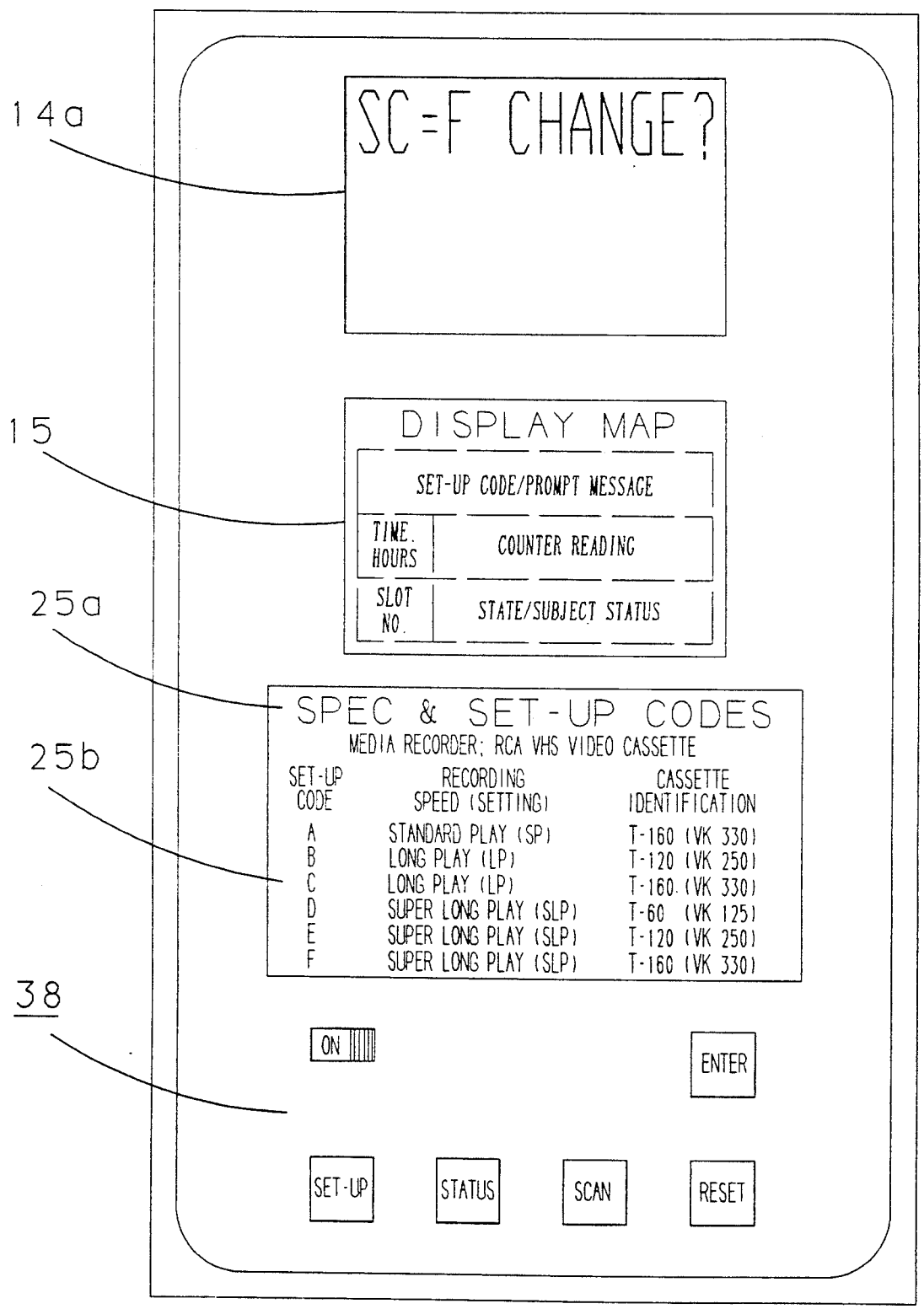
FIG. 8D is a plan view of electronic implementation of logging device illustratin operational display during set-up.

First, refer to FIG. 8D, which is a plan view of the electronic embodiment, illustrating operational display during set-up. Make certain that the recorder used is the same specified in electronic media recorder specification 25a, which for this example is an RCA Corporation VHS video cassette recorder. If not verified, the apparatus still may be usable if recorder design specifications correspond to the RCA Corporation design in terms of counter readings at given recording times and speeds. Otherwise, a device having the correct recorder specification is likely to be available for purchase during production.

Next, make sure the counter is set to 0000 at the beginning of tape reel before all taping/retrieval actions. All counter readings stored in ROM 52 (FIG. 7C), of the electronic apparatus are referenced to 0000 under these conditions and, therefore, setting the VCR counter at 0000 anywhere else on the tape will cause significantly different readings to appear on the VCR display versus display 14c of the logging device, FIG. 7A. All counter readings are approximate, however, as various mechanical tolerances, environmental effects, and program durations affect the true counter readings for a program start or end.

FIG. 8C presents a flow chart illustrating operation of the electronic implementation of the logging apparatus. This figure, in conjunction with instructions 26, FIG. 7B, and FIG. 7C, is used to define stepwise procedures during operation in the following. Three major activities are involved: (1) set-up, (2) status change, and (3) status monitoring:

1. Set-up—The initial step is to set up the device for the proper tape type and recording speed used:

(a) Referring to FIG. 7A, switch power ON by moving ON/OFF switch, located on keyboard 38, to the right. Observe the prompt "SELECT MODE" displayed in the set-up code and prompt area, which is identified in display map 15. FIG. 8D illustrates the general appearance of display 14c, displaying a subsequent prompt, with power switch in the ON position.

(b) A decision is required, whether to continue or quit. Assuming it is decided to set up the device, press SET-UP key located on keyboard 38. The prompt area then displays the message "SC=_ CHANGE?". The set-up code (SC) displayed is the default code or the last code entered.

(c) Referring to set-up code selection list 25b, FIG. 8D, a list of SCs and their corresponding recording speeds (and settings) and tape cassette identifications is given. Say, for example, it is decided to program SC equal to "F", which applies for SLP speed setting and T-160 tape cassette.

(d) Assuming a change in SC is required, press SCAN key on keyboard 38. Again, the message "SC=_ CHANGE?" appears. When SCAN is pressed during set-up, the next listed SC is displayed each time SCAN is pressed. The sequence is repeated starting with the first SC after code "F" is displayed. Continue pressing scan, if necessary, to change SC displayed until the prompt appears as shown in electronic display—set-up mode 14a, FIG. 8D, then press ENTER key on keyboard 38.

(e) In the event the first SC displayed is correct, press ENTER key immediately as shown in FIG. 8C.

(f) Pressing the ENTER key stores the desired SC in external RAM 60, and sets up the logging device to display the appropriate parameters during STATUS operation. In addition, a prompt "SC=F RESET?" is displayed, requiring another decision.

(g) If no further activity is required, move power switch on keyboard 38 to OFF position. In event the switch is not turned OFF, display 14c is turned off automatically, after a brief interval, to conserve battery 46a.

Figure 8E:
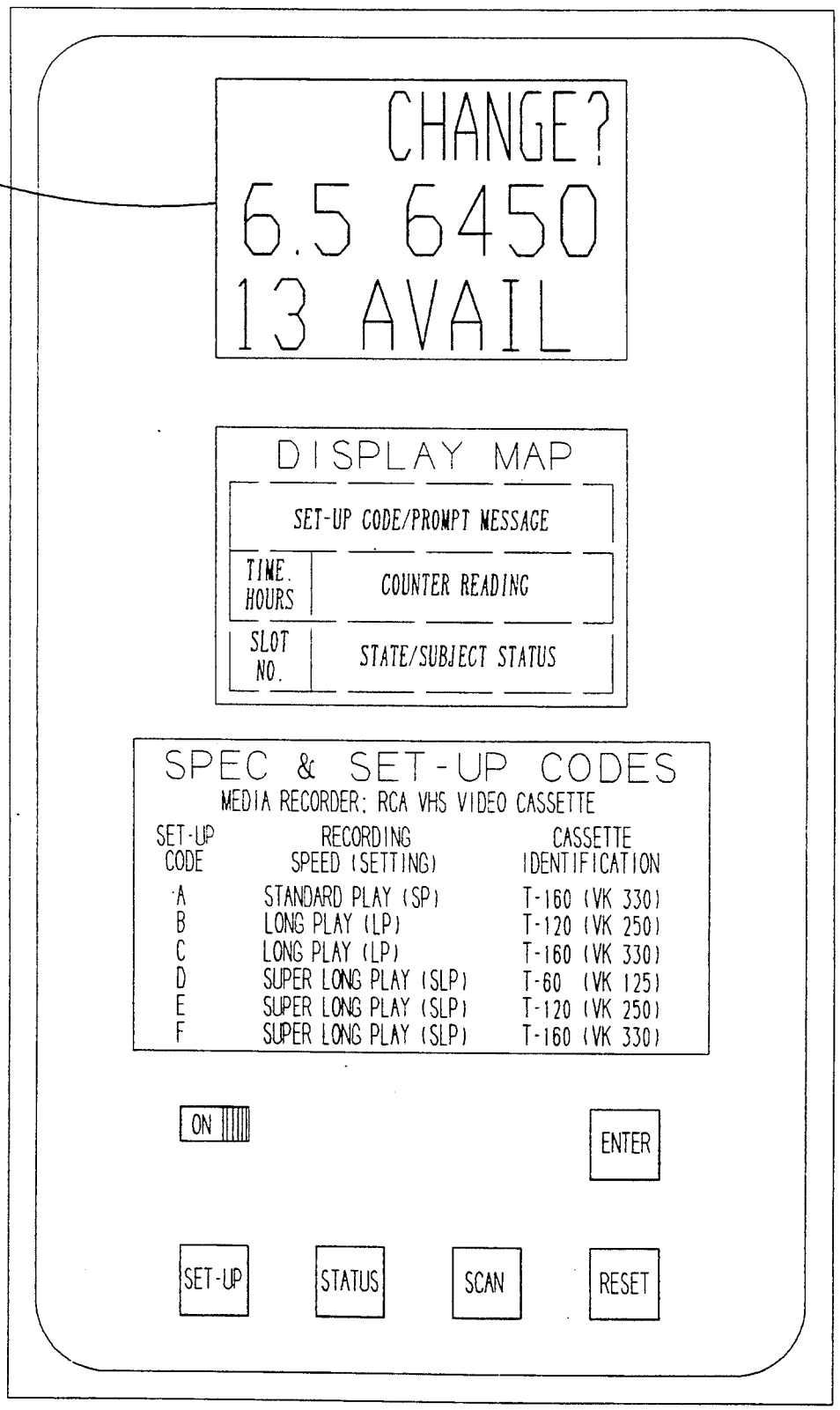
FIG. 8E is a plan view of electronic implementation of logging device illustrating operational display during status monitoring or change.

2. Status Change—Next, procedures for status change are discussed, which refers to changing the default or previously entered data which identify logged media-taped material. Refer to FIG. 8E, a plan view of electronic embodiment, illustrating operational display during status monitoring or change:

(a) On RESET or option after initial power ON, if a decision is made to change status of time slot data stored in memory, press STATUS on keyboard 38. A message is displayed on display 14c similar to that depicted in electronic display—status mode 14b, FIG. 8E, for a subsequent condition. Initially, data are displayed for time slot "1". Components of the status display are: prompt message "CHANGE?", displayed at top of display 14c, recording time in hours and counter reading, displayed in middle of display, and time slot number and state/subject status, displayed at bottom of display (refer to display map 15).

(b) Default or last state/subject status data entered are displayed. A decision is required, whether to change stored data or not. If a change is required, press STATUS. When STATUS is pressed during status change or monitoring, the data for the next numbered time slot are displayed each time STATUS is pressed. The sequence is repeated starting with data for time slot "1" after the data for the last time slot are displayed. Assume, for example, it is known space is available near the end of the tape starting in slot "13". Press STATUS on keyboard 38 repeatedly, as shown in FIG. 8C, until slot "13" data are displayed as shown in display—status mode 14b, FIG. 8E.

(c) As indicated, the display shows slot "13" has "AVAILABLE" status, which means at least a one-half -hour program can be taped in that location. If a longer time period for taping is necessary, a quick check of tape content, using procedures described in Status Monitoring, is required to establish the program starting point. Referring to time slot availability list 25d, FIG. 7B, a total of sixteen one-half hour time slots are available for "F" SC. Also for "F" SC, counter readings run from 0000 to 7420 (8 hours), and intermediate values differ from those for "E" SC for a given time slot number. The "E" SC corresponds to the specifications used in mechanical embodiment examples.

(d) Once determined that time slot status setting should be changed, press SCAN on keyboard 38. When SCAN is pressed during status change or monitoring, the next listed status term is displayed each time SCAN is pressed. The sequence is repeated starting with the first status term after "travel" is displayed. When the appropriate status term (subject) is displayed, press ENTER on keyboard 38. This action stores the new status setting in external RAM 60 for that time slot. At that point, a decision is required whether or not additional change is required; if so, press "STATUS". This action again indexes the time slot number to display applicable data. If no further change is desired, move power switch on keyboard 38 to OFF position.

3. Status Monitoring—Finally, procedures for status monitoring are discussed, which refers to actions required to survey logged material on a tape for purpose of subsequent change or viewing an excerpt. Obviously, these procedures correspond closely to those described for status change. An important difference is that the ENTER key on keyboard must not be pressed. Inadvertent or deliberate pressing of ENTER during status monitoring likely changes or destroys important records for previously recorded programs. For this reason, the ENTER key is separated from other control keys on keyboard 38 to reduce the probability of unwanted entries. Refer to right side of FIG. 8C, which charts status operation, for the discussion that follows:

(a) It is apparent that, on start-up, data for time slot "1" are displayed. Next slot data are called-up by pressing the STATUS key, which indexes the display logic to present the next numbered time slot, and so on. For "F" SC, a total of sixteen time slots are available for display for the example media recorder. Different SC settings result in fewer time slots, which range from four ("A" code) to twelve ("E" code), as shown in time slot availability list 25d, FIG. 7B.

(b) Similarly, monitoring may start from a higher numbered time slot than "1" during status change operations. In this case, the indexing proceeds from the currently displayed time slot and continues each time STATUS key is pressed.

(c) In both of previously described situations, when the time slot number displayed reaches the limit of those displayed for a given SC and STATUS key is again pressed, the count is recycled to display data for time slot "1".

(d) The SCAN key is only used during status change operations. If the SCAN key is pressed during status monitoring operations, it causes the display of possible erroneous status information and is likely to confuse the operator. Current status data stored in external RAM 60 are not affected, however, unless ENTER key is pressed after SCAN key is pressed.

The operation of electronic circuits, parts and components, depicted in FIG. 7C, as they relate to the operator's actions covered in previous paragraphs, are briefly discussed following. Refer also to FIG. 8C for description of manual actions which direct the flow of addresses, data, and control functions within the apparatus.

Power ON applies nominal +5-volt power from battery-driven power supply 46 to the keyboard 38, microcontroller 48, LCD 14c interface electronics, etc., which previously have been in power OFF state. External RAM 60 is furnished power at all times, including periods when power switch is OFF during normal operation, to retain current set-up and status information. On initial use, external RAM 60 power is applied when battery 46a is installed. Following battery 46a installation, a special code is entered to direct microcontroller 48 to load external RAM 60 with default set-up and status information. This code is entered when SET-UP and ENTER on keyboard 38 are pressed together.

Power switching ON is one-of-seven input commands which can be entered from keyboard 38. The remaining six input commands are entered when the SET-UP, STATUS, SCAN, RESET, and ENTER keys, and SET-UP/ENTER keys together are pressed. In all cases keyboard entry sends a single logic "0" to a unique bit of an input port. Port 1 of I/O ports 56 is bit addressable but not dual purpose, and is selected to receive keyboard 38 inputs. Port 1 acts as an octal 3-state buffer which passes the binary value of the input to the internal data bus. The system program in ROM 52 interprets the keyboard entry codes and causes the appropriate instruction execution, including display of prompts and/or data. These actions are carried out automatically when microcontroller 48 interprets the instructions in the system program, utilizing SFRs. The SFRs are 21 locations set aside in internal RAM 54, and specifically used for instruction execution and servicing functions.

Referring to FIG. 8C, a number of keyboard actions cause the display of prompts (e.g., "SELECT MODE", SC=_ RESET?, CHANGE?). Prompt terms, as well as tables listing SCs, state and subject terms, and other data required for display, are permanently stored in ROM 52. This is accomplished during manufacture of mask-programmed ROM 52. When the two-key code is entered at battery installation, prompt terms and default display data are fetched by microcontroller 48 from ROM 82 and placed in display-mapped external RAM 60, where they continue to reside until changed, as long as RAM power is maintained. During subsequent operation, when a keyboard entry dictates the display of a prompt, SC, or status data, these data are fetched from RAM 60, in the form of character codes required by the appropriate LCD controller/driver, and placed on data bus 42, FIG. 7C. These codes are unique 8-bit character generator codes for controller/driver 62 and 4-bit binary codes for controller/driver 64. The system program also places appropriate control signals on control bus 44 and memory addresses on address bus 40 in the course of instruction execution. Accordingly, controller/driver 62 receives two control bits for read/write operations and one address bit for internal register selection. Controller/driver 64 receives three control bits (2 for annunciator decoding and 1 for data input strobe), and three address bits for digit selection. Duty cycles and frame frequencies for recommended LCD module 66 configuration are well within acceptable margins for reliable operation.

External driver 62a receives four bits and power directly from controller/ driver 62, as shown in FIG. 7C. The control/data bits $CL_1$, $CL_2$, M, and D, provide clocking, switching, and character pattern data signals to accomplish LCD drive.

Data and control signals arrive at the I/O buffers of the appropriate controller/drivers, which then decode and process the data internally to provide the correct character displays, energizing individual display matrix cells (or segments) in the proper timing sequence. During aforementioned operations, inherent incrementing features of instructions for both microcontroller 48 and controller/driver 62 facilitate data transfers using look-up tables.

In a similar manner, when a keyboard entry dictates storage of new SC or status data in memory, the system program in ROM 52 in microcontroller 48 provides the instructions required to transfer the necessary data from ROM 52 to external RAM 60. Thereby, the log of SC and status data is updated to provide a current record of device recording speed/cassette identification setting and tape content.

SUMMARY, RAMIFICATIONS, AND SCOPE OF INVENTION

It is readily apparent, from the foregoing description of mechanical and electronic embodiments of an apparatus for logging electronic media-taped material, that a convenient record-keeping tool is provided. Both embodiments provide an easy-to-use and versatile mechanism for accurately recording subject, duration, and location on tape of electronic media-taped material. This capability fulfills an existing need and greatly simplifies recording identifying data and later retrieving a specific excerpt from a tape, compared with presently available methods. The most common existing method, self-adhesive labels and other written aids, is cumbersome and inadequate. The mechanical design economically lends itself to use in great numbers and structurally facilitates storage with the associated recorder tape. The latter feature is especially convenient for retrieving a particular subject for viewing and/or listening after an extended time period following recording.

Two implementations of the mechanical apparatus, horizontal and vertical, are feasible; however, the horizontal is preferred. The primary advantage of the horizontal, versus the vertical, mechanical apparatus is data input means are on the front of the device. This fact simplifies data input and lessens the risk of erroneous or inadvertent data input. The vertical implementation, however, has greater facility for increased number of tape time slots.

The electronic embodiment, although relatively more expensive to produce than the mechanical, is more universally adaptable to expanded capability and wider range of use conditions, in terms of tape types and recording devices. It is also more durable and convenient to use on a long-term, day-to-day basis, much in the manner of a TV remote controller. Battery power provides retention of tape status data stored in static RAM until operator retrieval/monitoring of specific information is desired. State-of-the-art LCD, controller/drivers, microelectronics and other parts provide exceptional capability for information storage/retrieval at low cost, small size, and minimum power.

Foregoing descriptions, although basically limited to an application related to taping commercial TV programs, should not be construed as limiting the scope of my invention. The same concept may be applied in a number of applications where media-taped material is collected, including video and/or audio tapes for home, scientific, or business use. Conceivably, digital data, collected in a scientific or business environment, also could be logged conveniently using such a device. Further, many variations of discrete specifications discussed are possible. For example, the mechanical embodiment has application in a design in which it is an integral part of the tape cassette container. Also, the electronic implementation, with increased keyboard and memory, is adaptable to allowing the operator to insert tailored subject descriptions, thereby enhancing later identification of material during retrieval/monitoring.

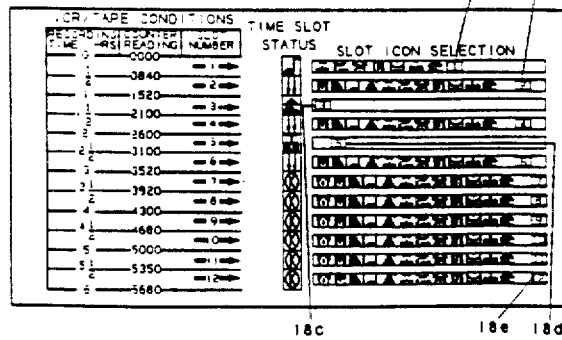

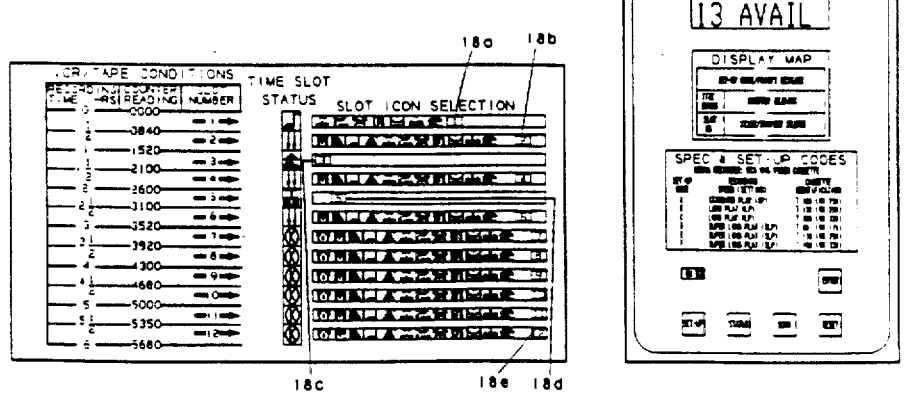

I claim:

1. An apparatus for logging descriptive information, such as subject, duration, location, and tape status, pertaining to material recorded by a cassette-type electronic media tape recorder, comprising a case; a panel face, characterized by showing the read-out locations of individual elements of said descriptive information for specified combinations of said tape recorder designs, tape speed settings of said tape recorder, and cassette tape types; a display means, in combination with said panel face read-out locations, characterized by display of descriptive indications of states of fractional-hour time slots on said cassette tape and subjects of said material residing in said time slots, indexed numerical designations for said time slots on said cassette tape, duration of discrete recordings of said material in said time slots, cumulative time durations and, depending on the specified recorder design, numerical counter readings from beginning of said cassette tape installed in said tape recorder, and a data input means, whereby an operator logs said descriptive information relative to the recorded material.

2. A logging apparatus according to claim 1 and having a mechanical embodiment, wherein said case holds a plethora of flat, elongated slides, having on their upper surfaces visible markings, including alphanumeric, symbolic, or iconic, characterized in that said visible markings identify potential said states that said time slots might assume, such as available or continued, and a multiplicity of said material subject categories representative of the electronic media which might be recorded, which said visible markings said operator uses in establishing the state and subject descriptive indication settings for said time slots during data input and output.

3. A mechanical logging apparatus according to claim 2, wherein each of said slides incorporated a tab which projects through a companion slot in said case, to allow said operator to move and position a slide in said case during data input, said tab being characterized by said indexed numerical designations affixed to said tab upper surface, designating successive fractional-hour time intervals from beginning of the tape and, thereby, cumulative number of said time slot.

4. A mechanical logging apparatus according to claim 3, wherein the total number of said time slots corresponds to the number of one-half hour time intervals available, for the specified tape speed setting and tape type.

5. A mechanical logging apparatus according to claim 2, wherein said case embodies guides, preventing interference between said slides; stabilization means for said slides to prevent accidental movement, through friction or other resistance, and a window, allowing visibility of said visible markings on said slides.

6. A mechanical logging apparatus according to claim 2, characterized in that said panel face defines the correspondence among said time slot number, cumulative time, and cumulative numerical counter reading, for an associated specified recorder design, tape speed setting, and tape type.

7. A mechanical logging apparatus according to claim 6, wherein the numerical counter readings displayed on said panel face substantially account for their inherent non-linearity versus recording time for said specified recorder design.

8. A mechanical logging apparatus according to claim 2, characterized in that an attached blocked area legend defines the specified recorder design, tape speed setting, and tape type for which the logging apparatus design applies.

9. A mechanical logging apparatus according to claim 2, characterized in that said case has plan dimensions approximating those of said cassette attendant to said electronic media tape recorder and minimal thickness, so that it can be stored in or attached to a container of said cassette for extended storage, if desired.

10. A logging apparatus according to claim 1 and having an electronic embodiment, wherein said case has shape and dimensions for fit and convenient use in one hand of said operator and contains data transmission and memory microcircuits, discrete parts, electronic display, printed circuit boards, wiring, battery voltage source and regulating elements, and such other electrical and electronic parts required to provide data input, data processing, and data output display functions pertaining to said descriptive information, and wherein said panel face incorporates the window of said electronic display; a keyboard, and blocked area legends characterized by defining a map of the display read-out locations, a definition of recorder design for which said apparatus applies, and the correspondence among a multiplicity of set-up codes for said apparatus, speed settings for said recorder, and identifications of said cassette tape types installable in said recorder.

11. An electronic logging apparatus according to claim 10, wherein said keyboard embodies a power switch and a multiplicity of keys, said keys characterized in that, on selective activation by said operator, said apparatus is directed during battery installation to store default data in random access memory; during subsequent operation to allow said operator to change or monitor said set-up code and, for a given time slot, state and material subject descriptive indication setting currently stored in said random access memory, and to interpret prompt messages, and following set-up action to reset said apparatus if time slot status change or monitoring action is required.

12. An electronic logging apparatus according to claim 10, wherein said electronic display has a plurality of data read-out fields presenting, during specified operator actions, set-up code, prompt message, cumulative recording time, time slot number, state and subject descriptive indication setting, and depending on said specified recorder design, cumulative numerical counter reading, which information said operator utilizes during set-up of said apparatus, for said specified recorder design, and during data input and output.

13. An electronic logging apparatus according to claim 12, wherein said electronic display is a liquid crystal display, with associated controller, driver, and separate power supply elements.

14. A logging apparatus according to claim 1 and having an electronic embodiment, wherein said data input means is provided through a system of input keys controlling battery energized electronic circuits which store and retrieve informational prompts and other data table elements on command of said operator for output via said display means and wherein said battery energized circuits furnish capability to accommodate a plurality of combinations of said recorder speed settings and said tape types for a specified design of said electronic media recorder.

15. An electronic logging apparatus according to claim 14, wherein said data table elements are characterized by generic lists, residing in read-only memory, of informational prompt messages by which said operator of said apparatus is led to perform the next sequential step during set-up and status mode, reset of discontinue, and status change and monitoring operations; set-up codes in combination with said recorder speed settings and tape types; indexed numerical designations, and cumulative time intervals and, for an associated recorder design, cumulative numerical counter readings from beginning of said tape for said time slots; state and subject status terms, and a current list, residing in said random access memory during normal operation, of default or operator-installed data relevant to applicable said tape.

16. An electronic logging apparatus according to claim 14, wherein said display means is a liquid crystal display module, comprising a multiplexed liquid crystal display in combination with supporting controller-driver, driver, and separate power supply parts, and having separate lines of multiple data read-out fields and alphanumeric capability; said module operating in response to system program instructions, stored in said read-only memory, and executed as a result of operator-directed keyboard actions.

* * * * *

UNITED STATES PATENT AND TRADEMARK OFFICE
CERTIFICATE OF CORRECTION

PATENT NO. : 5,151,687

DATED : September 29, 1992

INVENTOR(S) : George G. Younger

It is certified that error appears in the above-identified patent and that said Letters Patent is hereby corrected as shown below:

Title page, under References Cited, cancel "4,469,380" and
    substitute therefor --4,649,380--
The Title page, showing the illustrative figures, should be deleted and substitute therefor the attached Title page.

Sheet 17 of 20, cancel drawing "FIG. 8C (CONT'D)" and substitute therefor drawing --FIG. 8C--
Sheet 18 of 20, cancel drawing "FIG. 8C" and substitute therefor drawing --FIG. 8C (CONT'D)--
Column 1, line 44, cancel "rese-" and substitute therefor --reset- --
Column 1, line 45, cancel "table" and substitute therefor --able--
Column 1, line 61, cancel "and" and substitute therefor --as--
Column 4, line 2, cancel "illustratin" and substitute therefor --illustrating--
Column 6, line 17, cancel "slots: that" and substitute therefor --slots; that--
Column 9, line 11, cancel "specifcations 24. FIG. 4D" and substitute therefor --specifications 24, FIG. 4D--
Column 9, line 41, cancel "specifications 24 FIG. 4D." and substitute therefor --specifications 24, FIG. 4D.--
Column 10, line 1, cancel "blocks, key 22." and substitute therefor --blocks.--
Column 12, line 23, cancel "1.0-inch in width." and substitute therefor --1.0-inch in length and 1.5-inch in width.--
Column 12, line 52, cancel "advantage state" and substitute therefor --advantage. State--

UNITED STATES PATENT AND TRADEMARK OFFICE
CERTIFICATE OF CORRECTION

PATENT NO.   : 5,151,687

DATED        : September 29, 1992

INVENTOR(S)  : George G. Younger

It is certified that error appears in the above-identified patent and that said Letters Patent is hereby corrected as shown below:

Column 13, line 37, cancel "nominal5Additional" and substitute therefor --nominal 5-volt supply operation. Additional--

Column 13, line 64, cancel "required: these" and substitute therefor --required; these--

Table I, col. 1, cancel "3" and substitute therefor --3*--

Table I, col. 1, cancel "3*" and substitute therefor --3--

Column 20, line 10, cancel "vie-" and substitute therefor --view- --

Column 20, line 11, cancel "wing/auditing" and substitute therefor --ing/auditing--

Column 21, line 59, cancel "(FIG. 4D). found" and substitute therefor --(FIG. 4D) found--

Column 21, line 67, cancel "(FIG. 4E). found" and substitute therefor --(FIG. 4E) found--

Column 22, line 13, cancel "(FIG. 4C). at" and substitute therefor --(FIG. 4C) at--

Column 23, line 68, cancel "is-decided" and substitute therefor --is decided--

Column 26, line 35, cancel "ROM 82" and substitute therefor --ROM 52--

Column 28, line 40, cancel "incorporated" and substitute therefor --incorporates--

UNITED STATES PATENT AND TRADEMARK OFFICE
CERTIFICATE OF CORRECTION

PATENT NO. : 5,151,687
DATED : September 29, 1992
INVENTOR(S) : George G. Younger It is certified that error appears in the above-indentified patent and that said Letters Patent is hereby corrected as shown below:

Column 30, line 27, cancel "reset and discontinue" and substitute therefor --reset or discontinue--.

Signed and Sealed this

Second Day of November, 1993

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,151,687

DATED : September 29, 1992

INVENTOR(S) : George G. Younger

Page 4 of 5

It is certified that error appears in the above-identified patent and that said Letters Patent is hereby corrected as shown below:

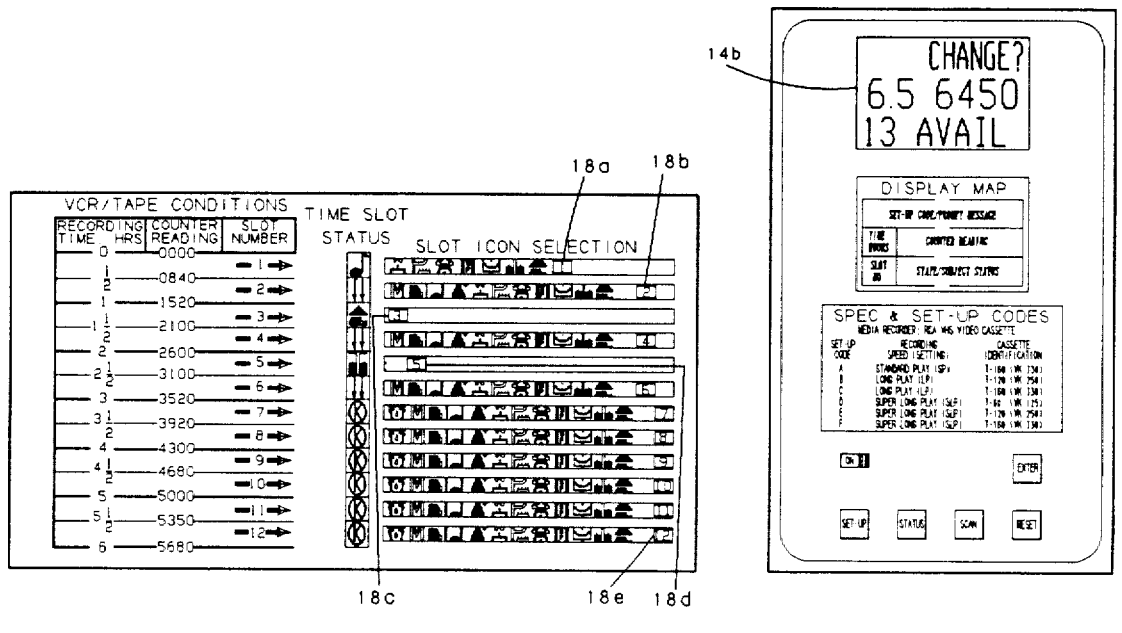

United States Patent [19]

Younger

[11] Patent Number: 5,151,687

[45] Date of Patent: Sep. 29, 1992

[54] APPARATUS FOR LOGGING ELECTRONIC MEDIA-TAPED MATERIAL

[76] Inventor: George G. Younger, 10553 Farallone Dr., Cupertino, Calif. 95014

[21] Appl. No.: 554,138

[22] Filed: Jul. 16, 1990

[51] Int. Cl.$^5$ .............................................. G09G 5/00
[52] U.S. Cl. ...................................... 340/706; 40/491
[58] Field of Search ............... 340/706, 711, 721, 734; 40/491, 901; 84/485 SR; 235/70 R, 70 A, 70 B, 70 C; 358/102

[56] References Cited

U.S. PATENT DOCUMENTS

| | | | |
|---|---|---|---|
| 2,738,760 | 3/1956 | Myers | 40/491 |
| 2,770,900 | 11/1956 | Smith | 40/491 |
| 2,803,075 | 8/1957 | Pearne | 40/506 |
| 2,918,036 | 12/1959 | Giordana | 116/308 |
| 3,596,390 | 8/1971 | Scalice | 40/491 |
| 4,005,388 | 1/1977 | Morley et al. | 340/711 |
| 4,025,766 | 5/1977 | Ng et al. | |
| 4,115,870 | 9/1978 | Lowell | 364/900 |
| 4,117,542 | 9/1978 | Klausner et al. | 364/900 |
| 4,469,380 | 3/1987 | Penna | 340/731 |
| 4,792,864 | 12/1988 | Watanabe et al. | 358/335 |

FOREIGN PATENT DOCUMENTS 0066963 4/1983 Japan.
2189922 11/1987 United Kingdom.

Primary Examiner—Jeffery A. Brier

[57] ABSTRACT

An apparatus for recording identifying data of electronic media-taped material is provided in two embodiments: mechanical and electronic. An example mechanical embodiment has a rectangular case with dimensions approximating those of a video cassette container, to facilitate compatible storage. Movable slides are mounted within the case, with icons on their upper surfaces, identifying status and subjects relating to tape condition and recorded material, respectively. The case front comprises a panel face, window, slots, and labels. Tabs project through the slots and provide means to set current tape status and material subject icons in the display window for selected tape time slots. During retrieval of material previously recorded, the operator determines taped material subject and duration, recorder counter reading, and time slot status by viewing the state/subject icons displayed, in relation to panel face labels. An example electronic embodiment has a thin, rectangular case, for convenient fit in one hand of the operator. The case holds electronic/electrical parts, including power supply, microcontroller, external RAM, LCD, display controller/drivers, and keyboard. The unit provides capability to store, via keyboard input, the current set-up code (for selected tape type and recorder tape speed setting) and status/subject information, which is held in continuously powered external RAM until needed for output retrieval/monitoring or change. Each unit case carries legends, as appropriate, identifying useful information; e.g., instructions, icon key, specifications, display map, state and subject settings, and time slot availability list.

16 Claims, 20 Drawing Sheets